US012602002B2

(12) United States Patent
Sakuma

(10) Patent No.: US 12,602,002 B2
(45) Date of Patent: Apr. 14, 2026

(54) IMAGE FORMING APPARATUS TO REDUCE POSITIONAL DEVIATION BETWEEN DOORS

(71) Applicant: CANON KABUSHIKI KAISHA, Tokyo (JP)

(72) Inventor: Tomofumi Sakuma, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/780,719

(22) Filed: Jul. 23, 2024

(65) Prior Publication Data

US 2025/0036068 A1 Jan. 30, 2025

(30) Foreign Application Priority Data

Jul. 28, 2023 (JP) ................................ 2023-123061

(51) Int. Cl.
*G03G 21/00* (2006.01)
*G03G 21/16* (2006.01)

(52) U.S. Cl.
CPC ... *G03G 21/1633* (2013.01); *G03G 2221/169* (2013.01)

(58) Field of Classification Search
CPC ......... G03G 21/1633; G03G 2221/169; G03G 21/1647; G03G 2221/1654; G03G 2221/1687; G06F 1/1675; G06F 1/1679; G06F 1/1681; H04N 1/00546; B65H 2402/45
USPC ......................................... 399/107, 110, 124
See application file for complete search history.

(56) References Cited

U.S. PATENT DOCUMENTS

| | | | | |
|---|---|---|---|---|
| 11,193,317 | B2 * | 12/2021 | Nakamura | G03G 21/1633 |
| 11,281,152 | B1 * | 3/2022 | Kokubu | G03G 21/1633 |
| 2006/0204276 | A1 * | 9/2006 | Takuwa | G03G 15/0872 399/110 |
| 2016/0291534 | A1 * | 10/2016 | Maeda | G03G 21/1633 |
| 2017/0219990 | A1 * | 8/2017 | Ishida | G03G 21/1633 |
| 2019/0243300 | A1 * | 8/2019 | Matsuo | B41J 29/13 |
| 2022/0350270 | A1 * | 11/2022 | Hiura | G03G 15/0142 |
| 2024/0345532 | A1 * | 10/2024 | Doi | G03G 21/1633 |
| 2024/0385567 | A1 * | 11/2024 | Hayayumi | G03G 21/1638 |

* cited by examiner

*Primary Examiner* — Robert B Beatty
(74) *Attorney, Agent, or Firm* — Canon U.S.A., Inc. IP Division

(57) ABSTRACT

An image forming apparatus includes a first door configured to pivot about a first pivot shaft in a left-right direction, an inside thereof being accessible in a state where the first door is open, and a second door configured to pivot about a second pivot shaft in the left-right direction, the inside thereof being accessible in a state where the second door is open. The first door includes a first fitting portion configured to pivot integrally with the first door. The second door includes a second fitting portion configured to pivot integrally with the second door and to be fitted into the first fitting portion. In a state where the first door is closed, the first fitting portion and the second fitting portion are fitted to each other to regulate a position of the first door relative to the second door in the left-right direction.

18 Claims, 16 Drawing Sheets

IMAGE FORMING APPARATUS TO REDUCE POSITIONAL DEVIATION BETWEEN DOORS

BACKGROUND

Field of the Disclosure

The present disclosure relates to an image forming apparatus, such as a printer, a copying machine, a facsimile machine, or a multifunction peripheral.

Description of the Related Art

An image forming apparatus having a configuration in which a door that is openable and closable with respect to an opening of an apparatus body is disposed and a user can access the inside of the apparatus body by opening the door has heretofore been known. United States Patent Application Publication No. 11193317 discusses an image forming apparatus having a configuration in which an exterior cover (door) is disposed to be pivotable relative to an apparatus body about a hinge portion (hinge) having a pivot shaft. The exterior cover allows an opening of the apparatus body to be opened or closed, which enables an operator to access the inside of the apparatus body by opening the exterior cover to perform a maintenance operation, such as a replacement operation or a cleaning operation for various units accommodated in the apparatus body, a jam clearance operation for removing a sheet (recording medium) jammed in a conveyance path, and the like.

In the case of such a door that is opened or closed by pivoting about the pivot shaft as described above, the position of the door when the door is closed may differ from a designed position due to positional deviation during attachment or clearance of a hinge portion. Particularly, in a configuration in which a plurality of doors each configured to pivot is arranged, a relative position between the doors may be different from a designed position. Particularly, relative positional deviation between the doors that are adjacent to each other in a vertical direction is easily recognizable by a user, and thus may degrade the appearance quality of the image forming apparatus.

SUMMARY OF THE DISCLOSURE

The present disclosure is directed to reducing relative positional deviation between doors in an image forming apparatus including a plurality of doors.

According to an aspect of the present disclosure, an image forming apparatus configured to form an image on a recording medium includes a first door configured to pivot about a first pivot shaft in a left-right direction in the image forming apparatus, an inside of the image forming apparatus being accessible in a state where the first door is open, and a second door configured to pivot about a second pivot shaft in the left-right direction, the inside of the image forming apparatus being accessible in a state where the second door is open, wherein the first door includes a first fitting portion configured to pivot integrally with the first door, wherein the second door includes a second fitting portion configured to pivot integrally with the second door and to be fitted into the first fitting portion, and wherein, in a state where the first door is closed, the first fitting portion and the second fitting portion are fitted to each other to regulate a position of the first door relative to the second door in the left-right direction.

Further features of the present disclosure will become apparent from the following description of exemplary embodiments with reference to the attached drawings.

DESCRIPTION OF THE EMBODIMENTS

<Image Forming System>

Figure 1:
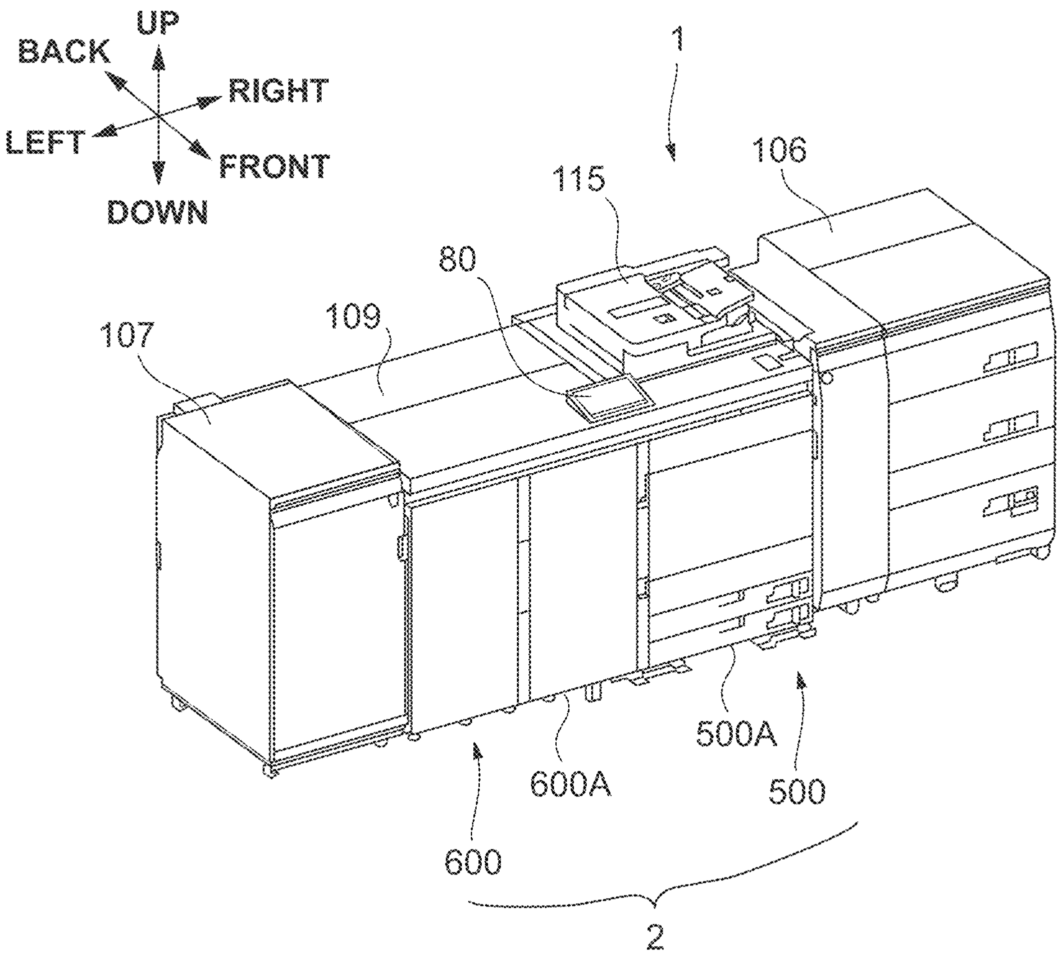
FIG. 1 is a perspective view illustrating an image forming system including an image forming apparatus according to one or more exemplary embodiments of the present disclosure.
Figure 2:
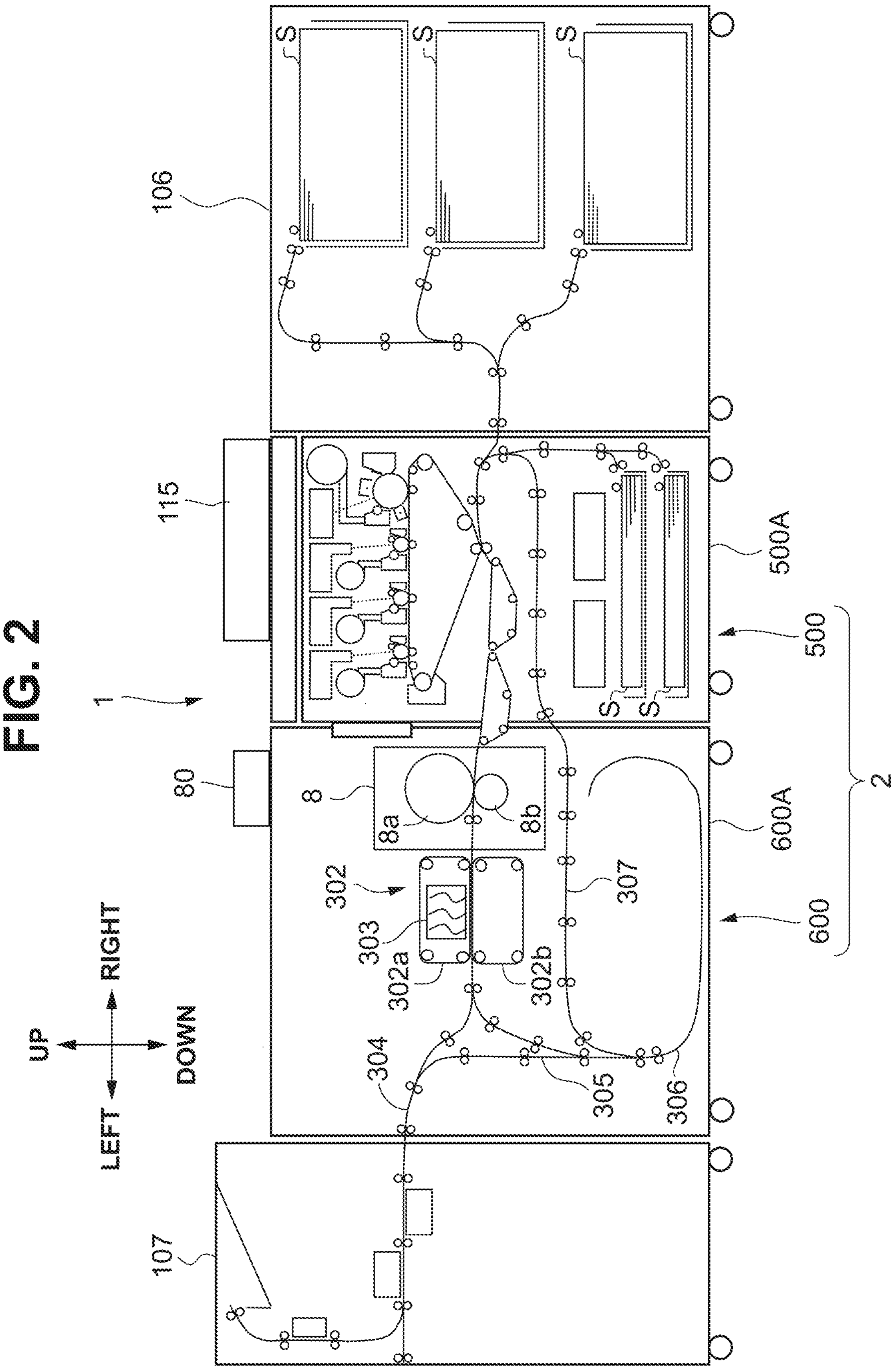
FIG. 2 is a schematic view illustrating the image forming system, according to one or more exemplary embodiments of the present disclosure.

An image forming system including an image forming apparatus according to an exemplary embodiment of the present disclosure will be described with reference to FIGS. 1 and 2. As illustrated in FIGS. 1 and 2, an image forming system 1 includes a large-capacity feeding device 106, an image forming apparatus 2, and a sensing device 107. The image forming apparatus 2 is an electrophotographic tandem-type full-color printer, and includes an image forming transfer device 500 and a fixing conveyance device 600.

The image forming apparatus 2 forms a toner image on a sheet fed from the large-capacity feeding device 106. The fixing conveyance device 600 fixes the toner image formed by the image forming transfer device 500 onto the sheet. The image forming transfer device 500 and the fixing conveyance device 600 may be desirably composed of separate housings 500A and 600A, respectively. With this configuration, even if the image forming apparatus 2 has a large size, the image forming apparatus 2 can be packed and transported in a separated manner into the housing 500A and the housing 600A. Accordingly, the configuration improves workability in distribution of the image forming apparatus 2 having a large size, that includes an operation flow from shipping to installation.

An operation portion 80 including a display (e.g., liquid crystal touch panel) configured to display various kinds of information on a front side, keys for inputting various kinds of information based on a user operation, and the like is disposed on the top of the fixing conveyance device 600. The operation portion 80 may be disposed at any other location, such as an upper portion of the image forming apparatus 2. A side where a user stands to operate the operation portion 80 is herein referred to as a "front side (or front)", and a side opposite to the front side is herein referred to as a "back side (or back)". A left side when viewed from the front side is herein referred to as "left", and a right side when viewed from the front side is herein referred to as "right".

A document scanning device 115 including an automatic document feeding portion and an image scanning portion is disposed on the top of the image forming apparatus 2. The automatic document feeding portion feeds documents one by one from a stacked document bundle to the image scanning portion. The image scanning portion scans an image on each document fed by the automatic document feeding portion, or scans an image on a document placed on a platen glass. The document scanning device 115 is selectively connected to the image forming apparatus 2 as an option.

The large-capacity feeding device 106 is disposed upstream of the image forming apparatus 2 in a sheet conveyance direction. The large-capacity feeding device 106 includes a plurality of (three in this case) sheet accommodating portions that accommodate sheets S. In place of the large-capacity feeding device 106, a manual feed device (not illustrated) or a long sheet feeding device (not illustrated), which can accommodate long sheets, may be selectively connected to the image forming apparatus 2.

In addition, another large-capacity feeding device, another manual feed device, or another long sheet feeding device may be selectively connected to an upstream side of the large-capacity feeding device 106.

The sensing device 107 is disposed downstream of the fixing conveyance device 600 in the sheet conveyance direction. The sensing device 107 scans a toner image formed on one surface or both surfaces of each sheet S, and detects an image density and an image position displacement. The image forming apparatus 2 performs a feedback correction on image data to be transmitted to the image forming apparatus 2 based on the image density and the image position displacement detected by the sensing device 107. The toner image is formed on the sheet S based on the corrected image data.

The image forming system 1 need not necessarily include the sensing device 107, and the sensing device 107 is selectively connected to the fixing conveyance device 600. Accordingly, if the sensing device 107 is connected to the fixing conveyance device 600, the sheet S having the toner image formed thereon by the image forming apparatus 2 is discharged to the sensing device 107. If the sensing device 107 is not connected to the fixing conveyance device 600, the sheet S is discharged to the outside from, for example, a discharge tray (not illustrated) disposed on the image forming apparatus 2, or a finisher connected to the image forming apparatus 2.

In the image forming system 1, a post-processing device (not illustrated), such as an inserter, a puncher, a case binding machine, a large-volume stacker, a folding machine, a finisher, or a trimmer, or a combination of such post-processing devices can be selectively connected to a downstream side of the fixing conveyance device 600 or the sensing device 107. If such a post-processing device is connected, the sheet S having the toner image formed thereon by the image forming apparatus 2 is discharged to a discharge tray or the like disposed in the post-processing device.

As described above, various optional devices are selectively connected to the image forming apparatus 2 according to the present exemplary embodiment, thereby making it possible to in-line output products obtained by performing various types of post-processing on various types of sheets S. Consequently, it is possible to provide the image forming system 1 with high productivity, high image quality, high stability, and high functionality.

<Image Forming Transfer Device>

Figure 3A:
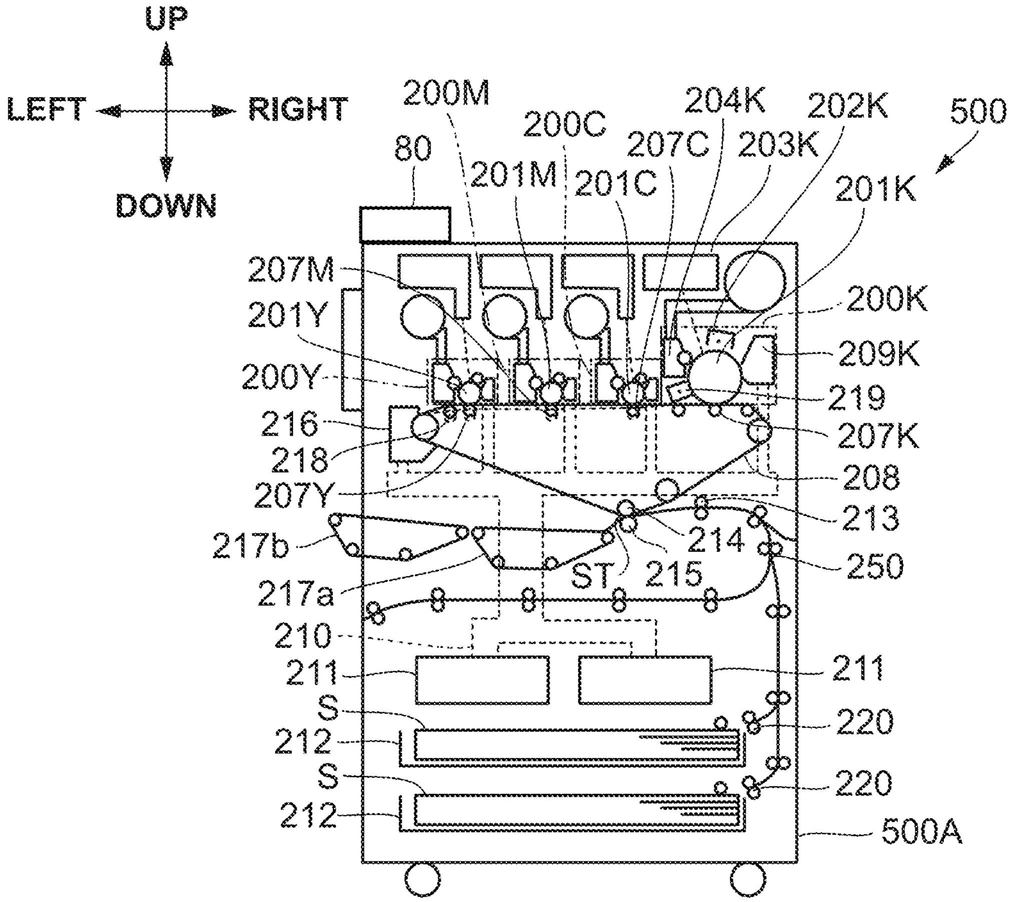
FIG. 3A is a sectional view of an image forming transfer device.
Figure 3B:
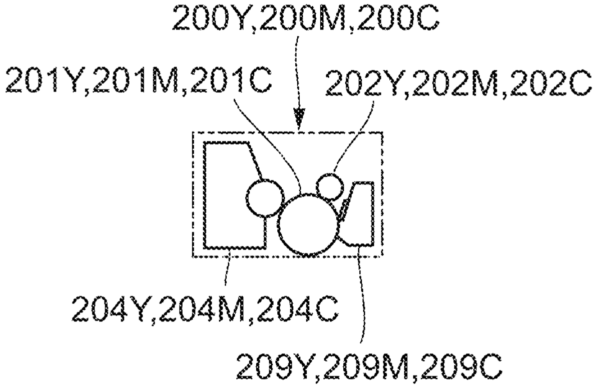
FIG. 3B is an enlarged view of an image forming station, according to one or more exemplary embodiments of the present disclosure.

Next, the image forming transfer device 500 will be described with reference to FIGS. 3A and 3B. The image forming transfer device 500 is a device using an intermediate transfer system in which image forming stations 200Y, 200M, 200C, and 200K, which form toner images of yellow, magenta, cyan, and black, respectively, and are accommodated in the housing 500A (inside the housing), are disposed to face an intermediate transfer belt 208. The image forming transfer device 500 forms the toner image on the sheet S based on image data obtained from the document scanning device 115 (see FIG. 1), which is disposed on the top of the housing 500A, or image data obtained from an external apparatus (not illustrated) such as a personal computer. Examples of the sheet S include paper, such as plain paper, thick paper, rough paper, uneven paper, and coated paper, plastic films, and cloths.

A process for conveying each sheet S in the image forming transfer device 500 will be described. The sheets S are accommodated in a stacked manner in one or more (two in this case) cassettes 212, and are supplied one by one in synchronization with an image forming timing by supply rollers 220. Each sheet S supplied by the supply rollers 220 is conveyed to a registration roller 213 disposed in the middle of a conveyance path 250. A skew correction and a timing correction are performed on the sheet S at the registration roller 213, and then the sheet S is conveyed to a secondary transfer portion ST. The secondary transfer portion ST is formed of an inner secondary transfer roller 214 and an outer secondary transfer roller 215 that are opposed to each other with the intermediate transfer belt 208 interposed therebetween. The secondary transfer portion ST is a transfer nip portion that applies a predetermined pressure and a secondary transfer voltage to transfer the toner image to the sheet S from the intermediate transfer belt 208. A process for forming an image conveyed to the secondary transfer portion ST at the same timing relative to the process for conveying each sheet S to the secondary transfer portion ST as described above will be described. First, the image forming stations 200Y to 200K will be described. The image forming stations 200Y to 200K have basically the same configuration except for the color of toner. Thus, the image forming station 200K for black will be described below as a typical example.

The image forming station 200K includes a photosensitive drum 201K, a charging device 202K, a laser scanner 203K, and a developing device 204K. The surface of the rotating photosensitive drum 201K is uniformly charged in advance by the charging device 202K. Subsequently, an electrostatic latent image is formed by the laser scanner 203K that is driven based on image data. Next, the developing device 204K develops the electrostatic latent image formed on the photosensitive drum 201K with toner included in developer, so that a toner image is formed on the photosensitive drum 201K. Developer is supplied to the developing device 204K, as needed, from a developer supply container depending on consumption of the developer used in the development of the toner image.

Then, a primary transfer roller 207K that is disposed opposite the image forming station 200K with the intermediate transfer belt 208 interposed therebetween applies a predetermined pressing force and a primary transfer voltage, thereby primarily transferring the toner image formed on the photosensitive drum 201K to the intermediate transfer belt 208. Primary transfer residual toner remaining on the photosensitive drum 201K after the primary transfer is removed by a drum cleaner 209K. The removed primary transfer residual toner is contained in a waste toner container 211 via a toner collection path 230.

The intermediate transfer belt 208 is stretched around a plurality of stretching rollers and the inner secondary transfer roller 214, and is moved at a speed corresponding to a rotational speed of photosensitive drums 201Y, 201M, 201C, and 201K by a motor or the like (not illustrated). Image forming processes for the respective colors are performed by the image forming stations 200Y to 200K in parallel as described above at timings when toner images are sequentially superimposed on the toner image of the color primarily transferred to the intermediate transfer belt 208 on an upstream side in a moving direction. As a result, a full-color toner image is finally formed on the intermediate transfer belt 208 and is conveyed to the secondary transfer portion ST. Secondary transfer residual toner remaining on the intermediate transfer belt 208 after the toner image passes through the secondary transfer portion ST is collected from the intermediate transfer belt 208 by a belt cleaner device 216.

By the above-described conveying process and image forming processes, the timing of each sheet S can match the timing of the toner image at the secondary transfer portion ST, and the toner image is secondarily transferred to the intermediate transfer belt 208 from the sheet S. After that, the sheet S is conveyed to the fixing conveyance device 600 by pre-fixation conveyance belts 217*a* and 217*b*, and the fixing conveyance device 600 fixes the toner image to the sheet S.

<Fixing Conveyance Device>

With reference again to FIG. 2, the fixing conveyance device 600 includes a fixing device 8 and a cooling device 302. The fixing device 8 includes a fixing roller 8*a* that is heated by a heater (not illustrated), and a pressure roller 8*b* that presses the sheet S against the fixing roller 8*a*. The sheet S that has the toner image formed thereon and has been conveyed from the image forming transfer device 500 is heated and pressed while being nipped and conveyed by a fixing nip portion, which is formed of the fixing roller 8*a* and the pressure roller 8*b*, thereby allowing the toner image to be fixed to the sheet S.

The sheet S heated by the fixing device 8 is conveyed toward the cooling device 302. The cooling device 302 includes cooling belts 302*a* and 302*b* and a heat sink 303. The cooling belts 302*a* and 302*b* are brought into contact with each other to form a cooling nip portion that nips and conveys the sheet S.

The heat sink 303 is disposed in contact with an inner peripheral surface of the cooling belt 302*a*, and the heat sink 303 cools the cooling belt 302*a*. The sheet S heated by the fixing device 8 is cooled as the heat of the sheet S is absorbed by the cooled cooling belt 302*a* when passing through the cooling nip portion.

In the case of forming the toner image only on one surface of the sheet S, the sheet S cooled by the cooling device 302 is discharged to the sensing device 107 via a discharge conveyance path 304. In the case of discharging the sheet S with the front and back sides reversed, the sheet S is switched back in a discharge reverse portion 305 to change positions of a leading edge and a trailing edge of the sheet S, and the sheet S is discharged via the discharge conveyance path 304 in a state where the front and back sides of the sheet S are reversed.

In the case of forming toner images on both surfaces of the sheet S, the sheet S with a first surface having the toner image formed thereon is switched back in a duplex reverse portion 306 to change positions of the leading edge and the trailing edge of the sheet S, and the sheet S is conveyed to a duplex conveyance path 307 in a state where the front and back sides of the sheet S are reversed. After that, the sheet S passes through the duplex conveyance path 307 and is returned to the image forming transfer device 500, and the toner image is formed on a second surface of the sheet S in the same image forming process as that performed on the first surface. Then, the sheet S passes through the fixing device 8 and the cooling device 302, and is discharged via the discharge conveyance path 304.

The above-described image forming transfer device 500 is configured to perform not only a full-color image formation using all the image forming stations 200Y to 200K described above, but also a monochrome image formation using only the image forming station 200K for black. In the monochrome image formation, primary transfer rollers 207Y, 207M, and 207C and a primary transfer auxiliary roller 218, which are illustrated in FIG. 3A, are displaced downward in an up-down direction by a separating mechanism (not illustrated). With this configuration, the photosensitive drums 201Y to 201C are separated from the intermediate transfer belt 208, thereby the operation of each of the image forming stations 200Y to 200C is stopped.

Accordingly, the operation of each of the image forming stations 200Y to 200C is stopped, which prevents abrasion of components due to unnecessary driving and leads to an increase in lifetimes of the image forming stations 200Y to 200C.

In the image forming station 200K that is not separated from the intermediate transfer belt 208, the photosensitive drum 201K has a larger diameter than the photosensitive drums 201Y to 201C. The configuration with a larger diameter is suitable for increasing the lifetime of the photosensitive drum 201K. The charging device 202K of the image forming station 200K is a corona charging device using a non-contact charging system. Charging devices 202Y, 202M, and 202C of the image forming stations 200Y, 200M, and 200C, respectively, are roller charging devices of a contact charging system using a charging roller. With this configuration, for the user who make great use of the monochrome image formation, it is possible to prevent a maintenance operation on the image forming station 200K that is used more frequently from being performed at shorter intervals than maintenance operations on the image forming stations 200Y to 200C that are used less frequently. In other words, the maintenance interval for the image forming station 200K is substantially the same as the maintenance interval for the image forming stations 200Y to 200C. A configuration of a large-diameter drum using a corona charging device has a wider charging width in a rotational axis direction of the corresponding photosensitive drum than a configuration of a small-diameter drum using a roller charging device, and thus the configuration of the large-diameter drum is suitable for high-speed charging operation. This leads to an improvement in productivity in the monochrome image formation.

In the image forming transfer device 500 in which the configuration of each of image forming stations 200Y to 200C described above is partially different from the configuration of the image forming station 200K, a difference in toner charging amount may occur between the photosensitive drums 201Y to 201C and the photosensitive drum 201K due to a difference in shape or abrasion amount. If there is a difference in the toner charging amount, the toner image is not uniformly transferred to the sheet S from the intermediate transfer belt 208 in a secondary transfer process, which may cause a defective transfer. For this reason, the photosensitive drum 201K is provided with a pre-transfer charging device 219 that is composed of a corona charging device so that the toner charging amount of the photosensitive drum 201K matches the toner charging amount of each of the photosensitive drums 201Y to 201C. The pre-transfer charging device 219 performs charging control on the photosensitive drum 201K before the toner image reaches the transfer nip portion, which is formed of the photosensitive drum 201K and the primary transfer roller 207K, thereby making the toner charging amount of the toner image formed on the photosensitive drum 201K uniform.

With the configuration described above, it is possible to provide the image forming transfer device 500 with high productivity, high image quality, high stability, and a long lifetime not only in the full-color image formation, but also in the monochrome image formation.

Next, a plurality of doors disposed on the housings 500A and 600A of the image forming apparatus 2 will be described with reference to FIGS. 4A and 4B. A front upper door 1105 and a front door 1103, which are disposed on the housing 500A, will be described below by way of example. The housing 500A is made of metal and is composed of a front side plate disposed on the front side, a back side plate that is disposed on the back side and supports the image forming stations 200Y to 200K and the like together with the front side plate, a stay for coupling the front side plate and the back side plate to each other, and a plurality of frames, such as columns, for supporting the front side plate and the back side plate.

Figure 4A:
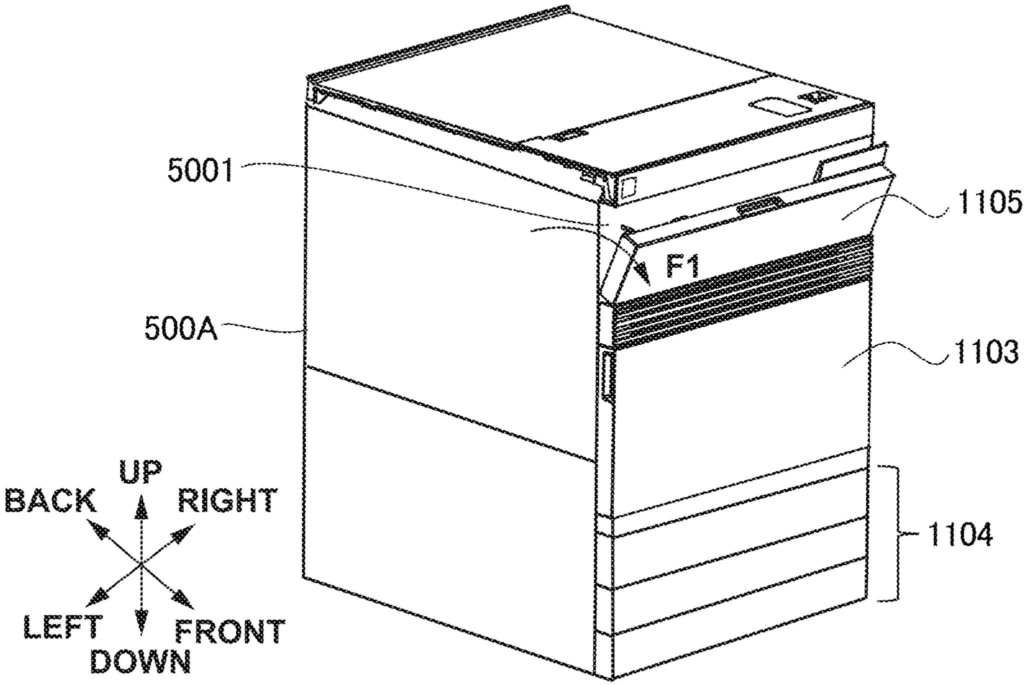
FIG. 4A is a perspective view illustrating a state where a front upper door is open.

As illustrated in FIG. 4A, a first opening 5001 is formed in the housing 500A serving as an apparatus body. The front upper door 1105 is disposed to be pivotable about a door lower side (second opening side) as a pivot center so that the first opening 5001 can be opened or closed. A front upper door hinge portion 700A (see FIGS. 5 to 6B) to be described below allows the front upper door 1105 serving as a first door to pivot in a direction indicated by an arrow F1 about a hinge pin, which is disposed on the housing 500A in a horizontal direction (left-right direction), as a pivot shaft.

Figure 4B:
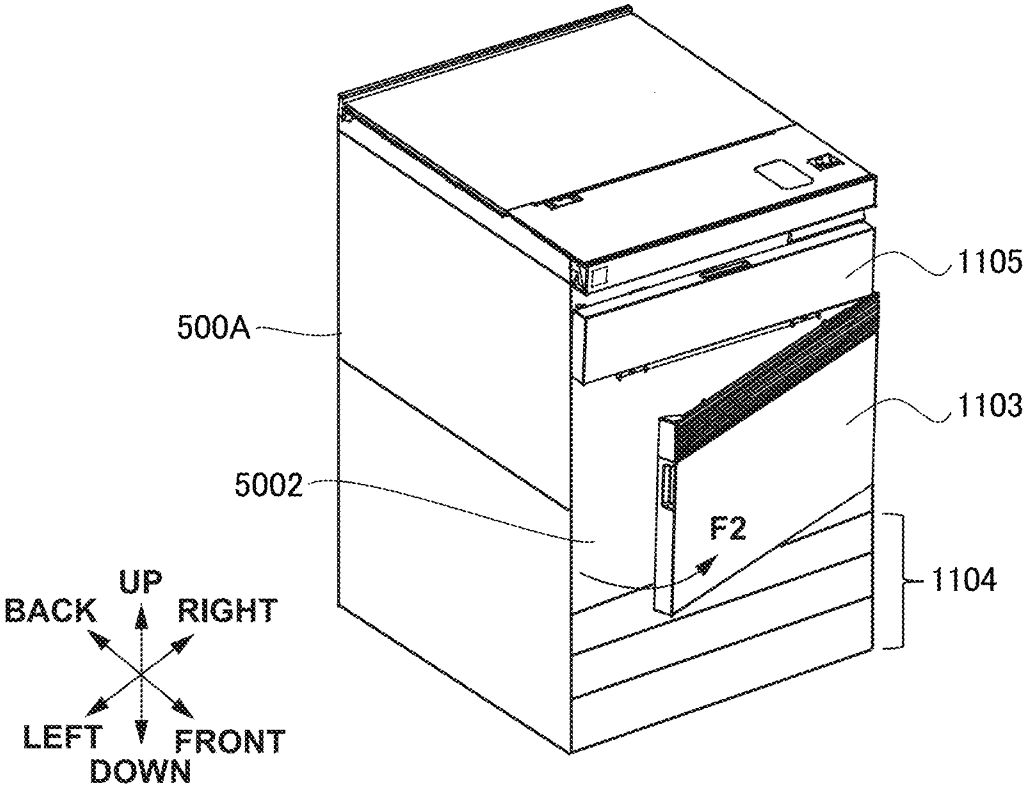
FIG. 4B is a perspective view illustrating a state where a front door is open, according to one or more exemplary embodiments of the present disclosure.

As illustrated in FIG. 4B, on a side of the housing 500A where the first opening 5001 is formed, a second opening 5002 is formed below the first opening 5001 in the vertical direction (below in the up-down direction). The front door 1103 is disposed to be pivotable about a door right side as a pivot center so that the second opening 5002 can be opened or closed. As illustrated in FIG. 4B, the front door 1103 is disposed adjacent to the front upper door 1105 below the front upper door 1105 in the up-down direction. A front door hinge portion 700B (see FIGS. 7 to 8B) allows the front door 1103 serving as a second door to pivot in a direction indicated by an arrow F2 about a hinge pin, which is disposed at a right end portion of the housing 500A in the up-down direction, as a pivot shaft.

The first opening 5001 and the second opening 5002 may be openings that are integrally formed.

The front upper door 1105 and the front door 1103 are each formed of a material, such as a resin, so that surfaces thereof can be easily decorated. In a closed state, the surfaces of the front upper door 1105 and the front door 1103 form a part of an exterior package together with a plurality of cassette covers 1104 on the front side of the image forming apparatus 2. Each of the cassette covers 1104 is an exterior cover disposed on each cassette 212 that is accommodated in the housing 500A in such a manner that the cassette 212 is slidable and movable in a front-back direction. The front upper door 1105, the front door 1103, and the cassette covers 1104 are each formed of, for example, a polycarbonate (PC)/acrylonitrile-butadiene-styrene (ABS) resin, a polyacetal resin, or the like.

Although not illustrated, a magnet may be disposed on the inside of each of the front upper door 1105 and the front door 1103, and on the housing 500A, a sheet metal member may be disposed at a position opposite the corresponding magnet in a state where the front upper door 1105 and the front door 1103 are closed. With this configuration, when the front upper door 1105 and the front door 1103 are closed, the magnet and the sheet metal member attract each other due to a magnetic force, thereby maintaining a state where the front upper door 1105 and the front door 1103 are closed, which is favorable. Next, the front upper door hinge portion 700A and the front door hinge portion 700B that are used for disposing the front upper door 1105 and the front door 1103 on the housing 500A in such a manner that the front upper door 1105 and the front door 1103 can be opened and closed will be described. First, the front upper door hinge portion 700A will be described with reference to FIGS. 5 to 6B.

<Front Upper Door Hinge Portion>

Figure 5:
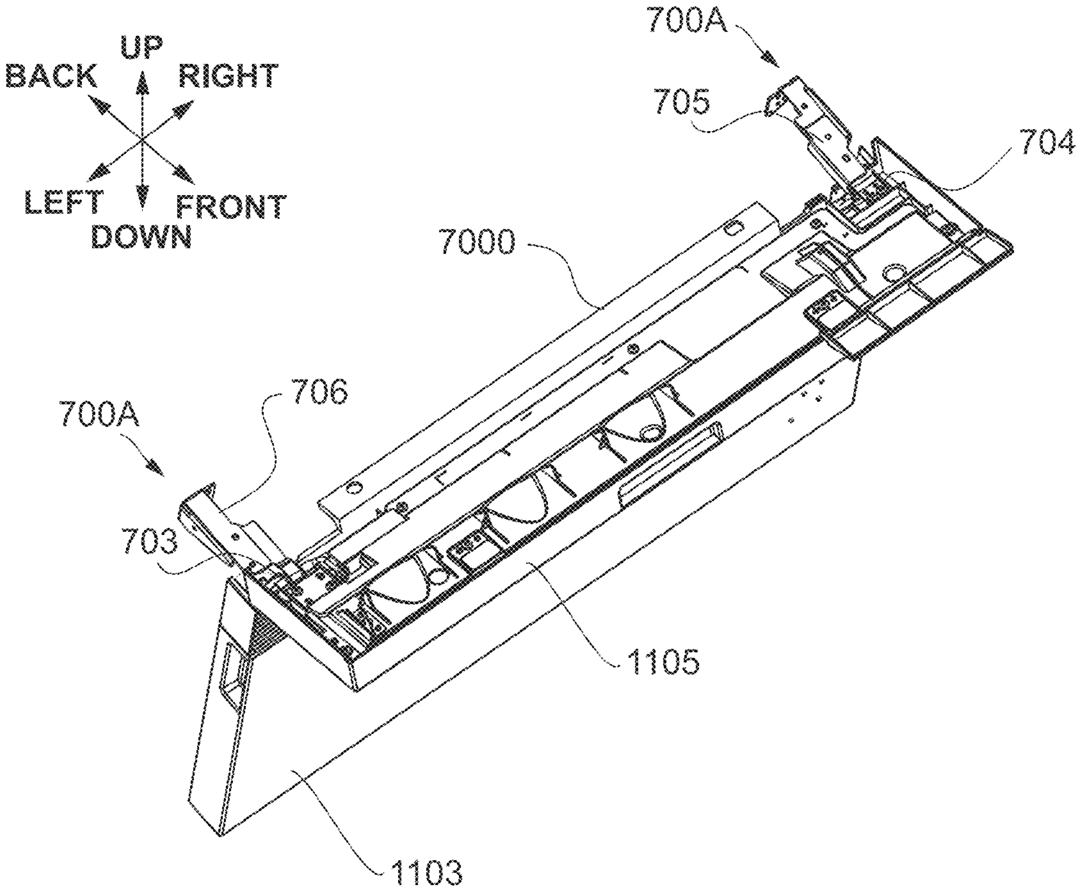
FIG. 5 is a perspective view illustrating a front upper door right hinge and a front upper door left hinge, according to one or more exemplary embodiments of the present disclosure.

As illustrated in FIG. 5, the front upper door hinge portion 700A serving as a first hinge portion includes a front upper door left hinge 703, a front upper door right hinge 704, a front upper door right hinge holding member 705, and a front upper door left hinge holding member 706, and supports the front upper door 1105 to be pivotable relative to the housing 500A. The front upper door left hinge 703 is fixed to a left end portion of the front upper door 1105, and the front upper door right hinge 704 is fixed to a right end portion of the front upper door 1105. The front upper door left hinge holding member 706 and the front upper door right hinge holding member 705, each serving as a first holding portion, are disposed in a protruding manner toward the front upper door left hinge 703 and the front upper door right hinge 704, respectively, each serving as a second holding portion disposed on the front upper door 1105, from the housing 500A.

Figure 6A:
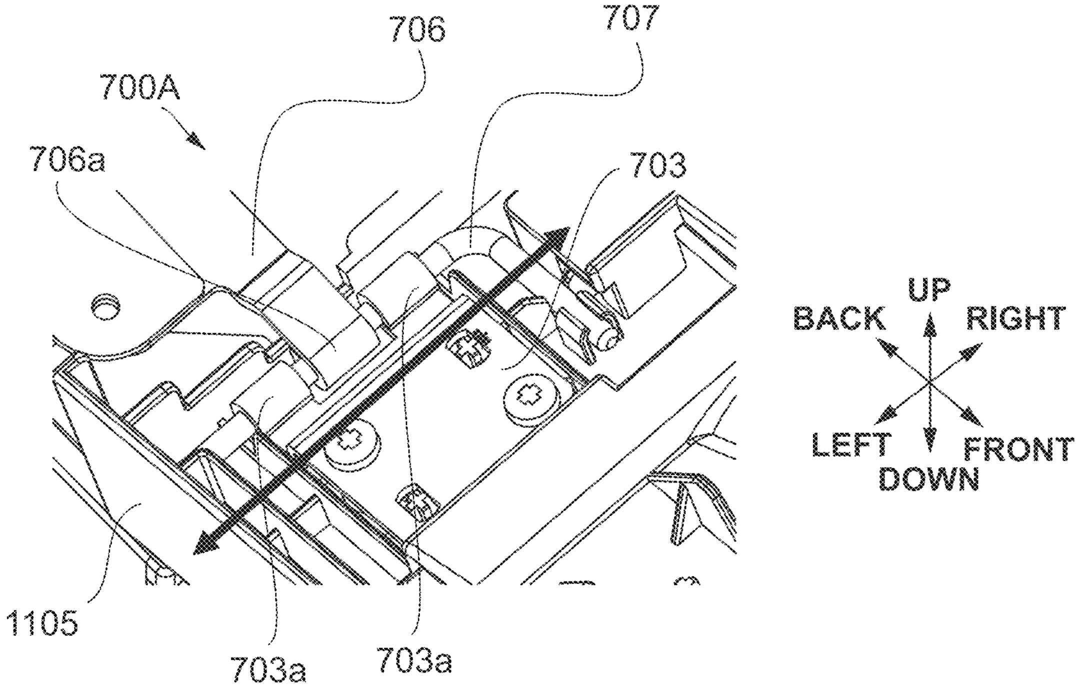
FIG. 6A is an enlarged view of the front upper door right hinge.

As illustrated in FIG. 6A, the front upper door hinge portion 700A includes a left hinge pin 707. In the front upper door left hinge 703, hollow tubular portions 703*a* are formed at two locations at an interval in the left-right direction. In a left end portion of the front upper door 1105, not only the front upper door left hinge 703, but also the rod-like left hinge pin 707 formed in an L-shape is mounted herein in a state where the left hinge pin 707 is inserted into the tubular portions 703*a*. The front upper door left hinge 703 pivotably holds the left hinge pin 707 with a pair of tubular portions 703*a*. On the other hand, the front upper door left hinge holding member 706 includes an engaging portion 706*a* formed at a tip thereof. The engaging portion 706*a* loosely engages with the left hinge pin 707 between the pair of tubular portions 703*a*. With this configuration, the front upper door left hinge 703 and the front upper door left hinge holding member 706 can pivot about the left hinge pin 707 as a pivot shaft with play (hereinafter referred to as a "clearance"). Thus, the front upper door left hinge 703 is movable with respect to the front upper door left hinge holding member 706 in any of the up-down direction, the front-back direction, and the left-right direction.

Figure 6B:
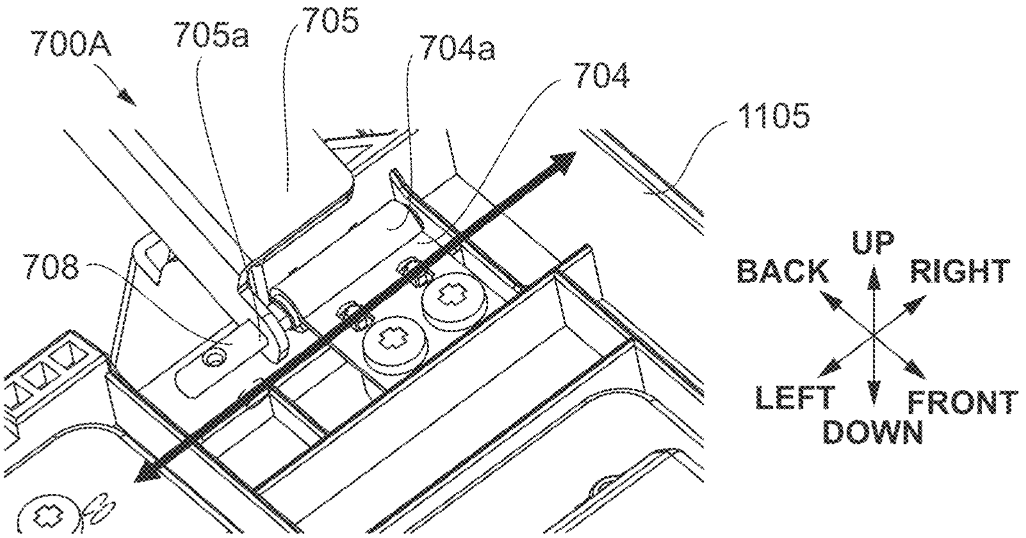
FIG. 6B is an enlarged view of the front upper door left hinge, according to one or more exemplary embodiments of the present disclosure.

As illustrated in FIG. 6B, the front upper door hinge portion 700A further includes a right hinge pin 708. In the front upper door right hinge 704, a hollow tubular portion 704*a* is formed to extend in the left-right direction. In a right end portion of the front upper door 1105, not only the front upper door right hinge 704, but also the rod-like right hinge pin 708 is mounted in a state where the right hinge pin 708 is inserted into the tubular portion 704*a*. The right hinge pin 708 and the left hinge pin 707, each serving as a first pivot shaft, are coaxially arranged. On the other hand, the front upper door right hinge holding member 705 is includes a projecting portion 705*a* formed at a tip thereof, and the projecting portion 705*a* has a through-hole. The diameter of the through-hole of the projecting portion 705*a* is larger than the diameter of the right hinge pin 708. Thus, the right hinge pin 708 is loosely fitted into the through-hole of the projecting portion 705*a*. With this configuration, the front upper door right hinge 704 and the front upper door right hinge holding member 705 can pivot about the right hinge pin 708 as a pivot shaft with a clearance. Therefore, the front upper door right hinge 704 is movable with respect to the front upper door right hinge holding member 705 in any of the up-down direction, the front-back direction, and the left-right direction.

In the present exemplary embodiment, a larger gap is secured between the tubular portions 703*a* of the front upper door left hinge 703 and the engaging portion 706*a* of the front upper door left hinge holding member 706 in the left-right direction than in other directions. Further, a larger gap is secured between the tubular portion 704*a* of the front upper door right hinge 704 and the projecting portion 705*a* of the front upper door right hinge holding member 705 in the left-right direction than in other directions. Accordingly, a movable range in the left-right direction (dynamic clearance in a pivotal axis direction) of the front upper door 1105 is larger than movable ranges thereof in the up-down direction and the front-back direction.

<Front Door Hinge Portion>

Figure 7:
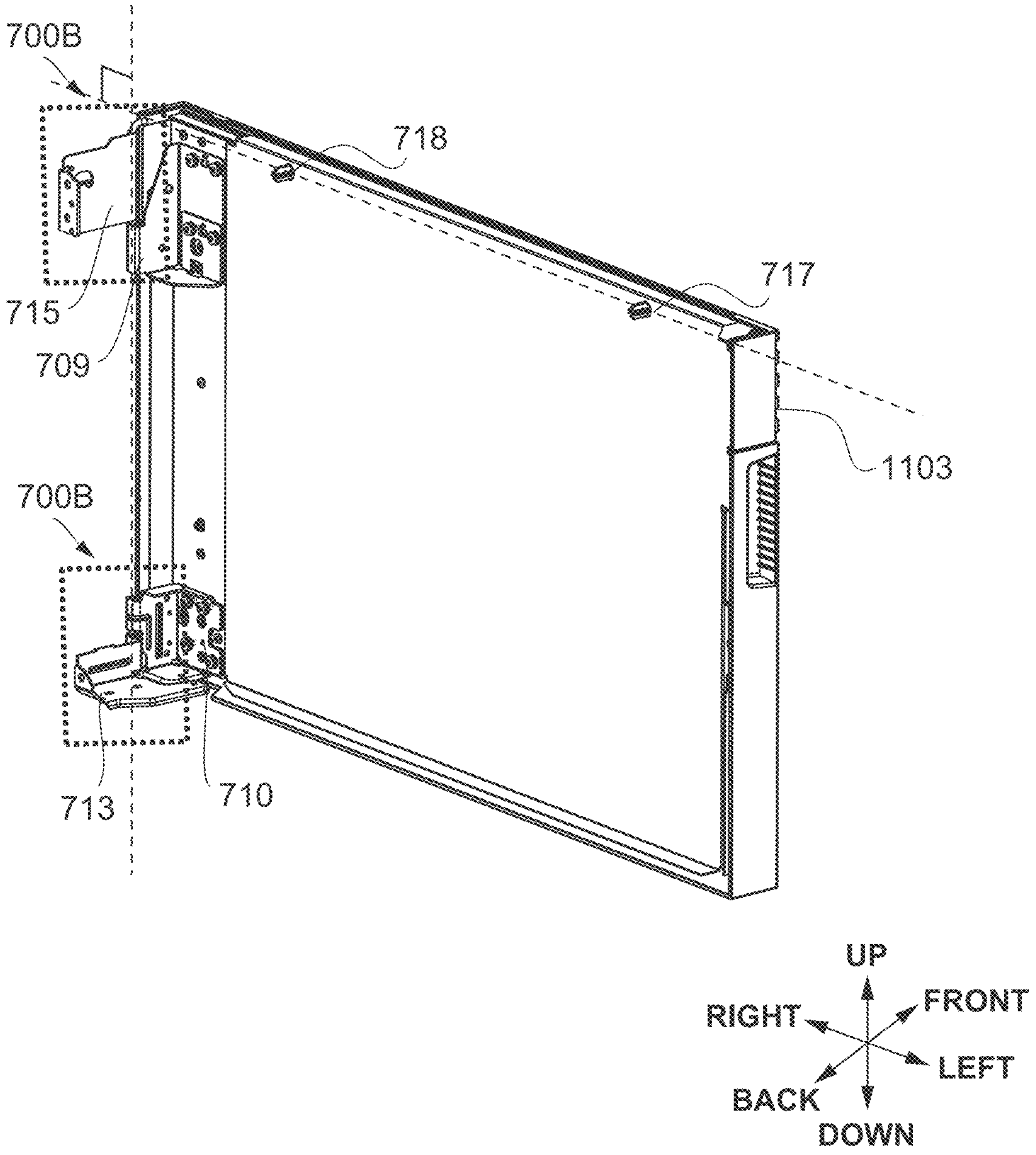
FIG. 7 is a perspective view illustrating a front door upper hinge and a front door lower hinge, according to one or more exemplary embodiments of the present disclosure.

Next, the front door hinge portion 700B will be described with reference to FIGS. 7 to 8B. As illustrated in FIG. 7, the front door hinge portion 700B serving as a second hinge portion includes a front door upper hinge 709, a front door lower hinge 710, a front door upper hinge holding member 715, and a front door lower hinge holding member 713, and supports the front door 1103 to be pivotable relative to the housing 500A. The front door upper hinge 709 and the front door lower hinge 710 are fixed to a right end portion of the front door 1103 at an interval in the up-down direction. The front door upper hinge holding member 715 and the front door lower hinge holding member 713, each serving as a third holding portion, are disposed in a protruding manner toward the front door upper hinge 709 and the front door lower hinge 710, respectively, each serving as a fourth holding portion disposed on the front door 1103, from the housing 500A.

Figure 8A:
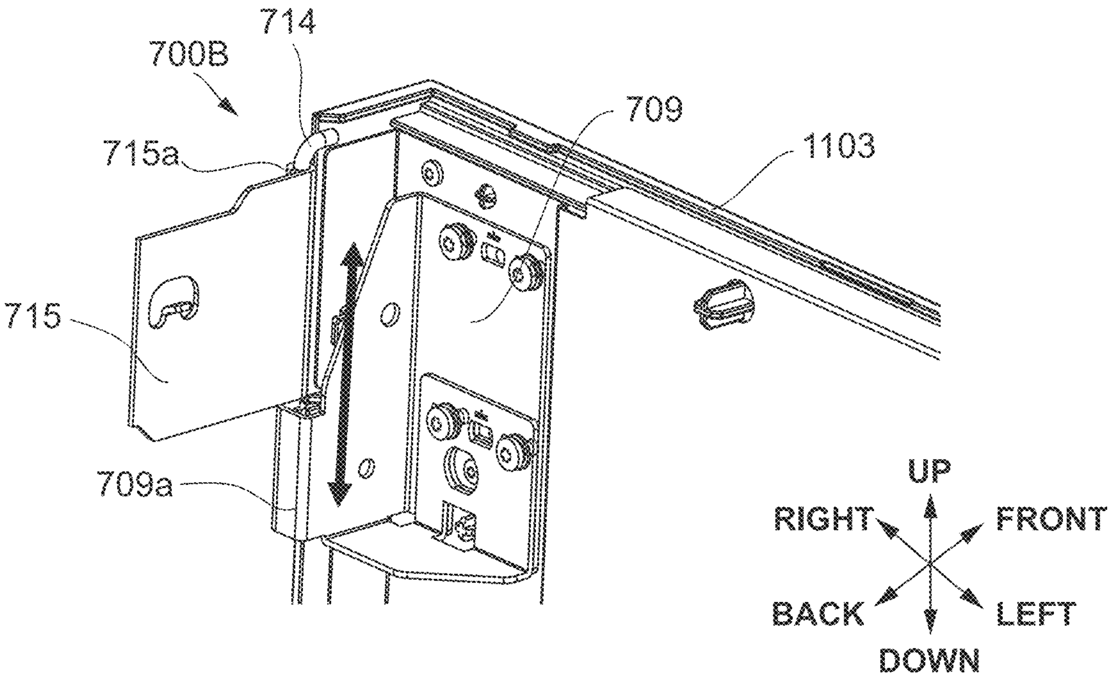
FIG. 8A is an enlarged view of the front door upper hinge.

As illustrated in FIG. 8A, the front door hinge portion 700B includes an upper hinge pin 714.

The front door upper hinge 709 includes a hollow tubular portion 709*a* extending in the up-down direction, and the front door upper hinge holding member 715 includes a hollow tubular portion 715*a* extending in the up-down direction. On the front door 1103, the rod-like upper hinge pin 714 is mounted in a state where the upper hinge pin 714 is inserted into the tubular portion 709*a* and the tubular portion 715*a*. The diameter of the tubular portion 709*a* and the diameter of the tubular portion 715*a* are larger than the diameter of the upper hinge pin 714. Thus, the upper hinge pin 714 is loosely fitted into the tubular portion 709*a* and the tubular portion 715*a*. With this configuration, the front door upper hinge 709 and the front door upper hinge holding member 715 can pivot about the upper hinge pin 714 as a pivot shaft with a clearance. Therefore, the front door upper hinge 709 is movable with respect to the front door upper hinge holding member 715 in any of the up-down direction, the front-back direction, and the left-right direction.

Figure 8B:
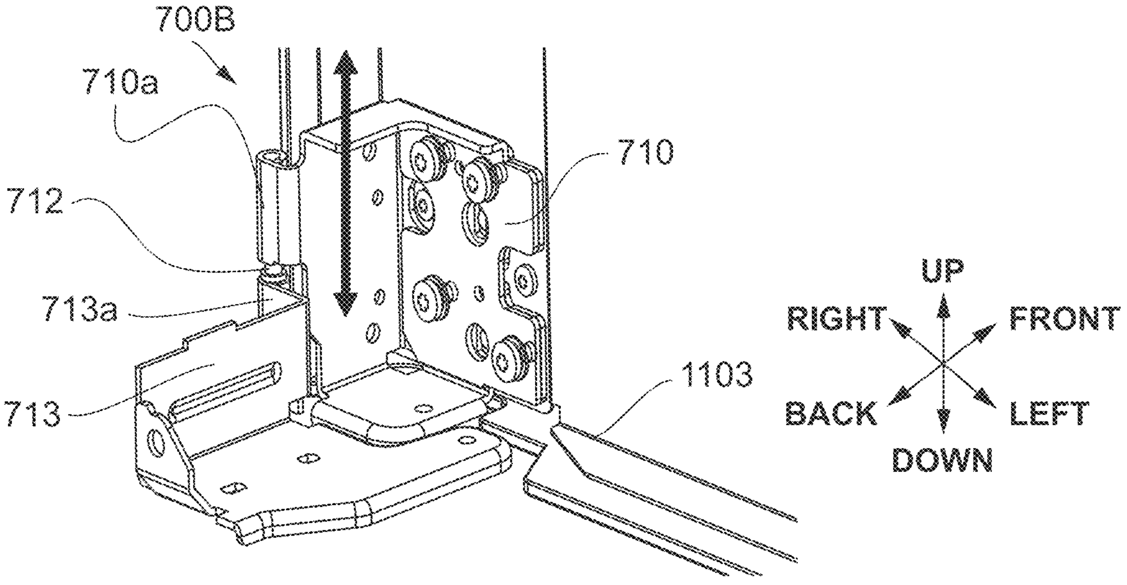
FIG. 8B is an enlarged view of the front door lower hinge, according to one or more exemplary embodiments of the present disclosure.

As illustrated in FIG. 8B, the front door hinge portion 700B further includes a lower hinge pin 712. The front door lower hinge 710 includes a hollow tubular portion 710*a* extending in the up-down direction. The front door lower hinge holding member 713 includes a hollow tubular portion 713*a* extending in the up-down direction. The tubular portion 713*a* is mechanically fastened in a state where the lower hinge pin 712 is inserted into the tubular portion 713*a*, and a remaining part of the lower hinge pin 712 is inserted into the tubular portion 710*a*. The lower hinge pin 712 and the upper hinge pin 714 each serving as a second pivot shaft are coaxially arranged. The diameter of the tubular portion 713*a* and the diameter of the tubular portion 710*a* are larger than the diameter of the lower hinge pin 712. Thus, the lower hinge pin 712 is loosely fitted into the tubular portion 713*a* and the tubular portion 710*a*. With this configuration, the front door lower hinge 710 and the front door lower hinge holding member 713 can pivot about the lower hinge pin 712 as a pivot shaft with a clearance. Therefore, the front door lower hinge 710 is movable with respect to the front door lower hinge holding member 713 in any of the up-down direction, the front-back direction, and the left-right direction. In the present exemplary embodiment, a movable range in the up-down direction (dynamic clearance in the pivotal axis direction) of the front door 1103 is larger than movable ranges thereof in the front-back direction and the left-right direction.

While the present exemplary embodiment illustrates an example where hinge mechanisms are disposed at two locations, i.e., at both ends in the left-right direction and at both ends in the up-down direction, the hinge mechanisms are not limited thereto. At least one hinge mechanism may be disposed for each of the front upper door 1105 and the front door 1103 depending on the weight of the front upper door 1105 and the front door 1103, the specifications of a hinge to be used, and the like.

Figure 16A:
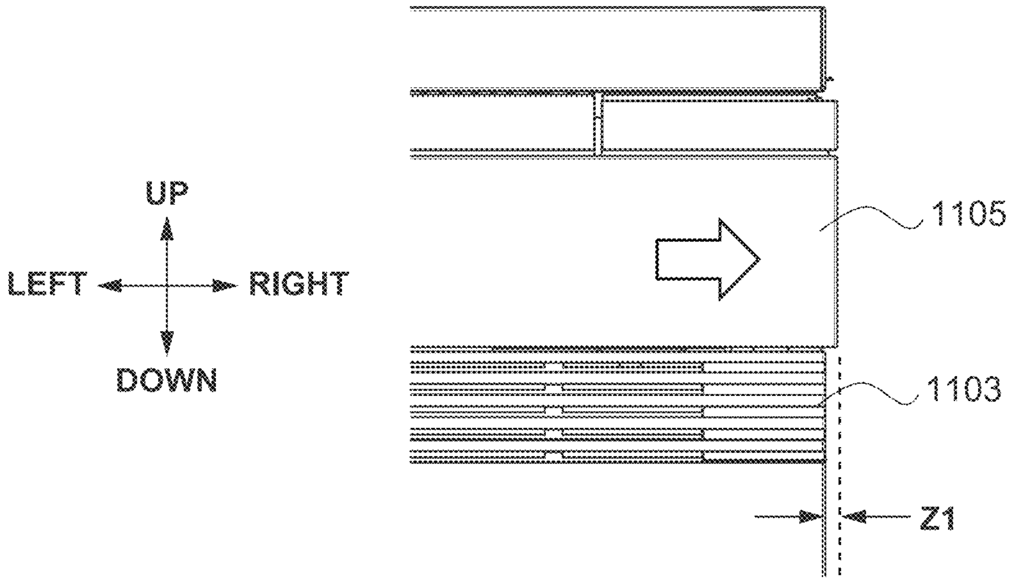
FIG. 16A illustrates positional deviation between the front upper door and the front door in a left-right direction when the front upper door deviates from the front door.
Figure 16B:
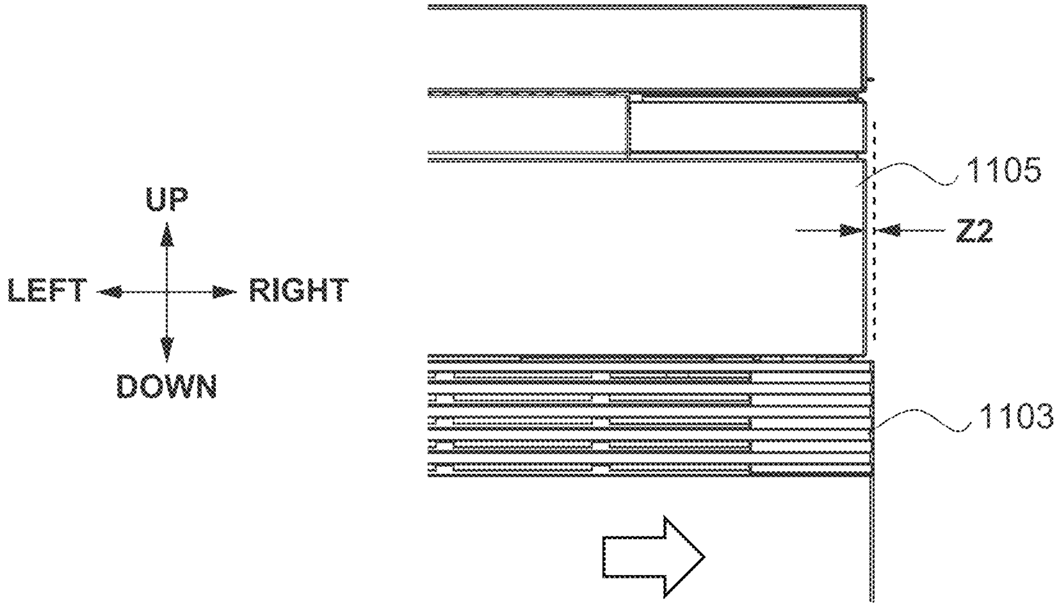
FIG. 16B illustrates positional deviation between the front upper door and the front door in the left-right direction when the front door deviates from the front upper door, according to one or more exemplary embodiments of the present disclosure.

In the configuration of the related art in which the front upper door 1105 and the front door 1103 are disposed adjacent to each other in the housing 500A, relative positional deviation between the front upper door 1105 and the front door 1103 may occur due to an error in component part accuracy. FIGS. 16A and 16B each illustrate a state where the front upper door 1105 or the front door 1103 deviate in the left-right direction. As illustrated in FIG. 16A, when the front upper door 1105 deviates to the right side with respect to the front door 1103 (deviation amount Z1), the right end of the front upper door 1105 projects rightward from the right end of the front door 1103, which may cause a gap therebetween. On the other hand, as illustrated in FIG. 16B, when the front door 1103 deviates to the right side with respect to the front upper door 1105 (deviation amount Z2), the right end of the front door 1103 projects rightward from the right end of the front upper door 1105, which may cause a gap therebetween.

This occurs because the front upper door 1105 and the front door 1103 are each disposed to be openable and closable with respect to the housing 500A with the front upper door hinge portion 700A and the front door hinge portion 700B. A large allowance (clearance) in the left-right direction is secured for the front upper door hinge portion 700A, in which the pivotal axis direction is the left-right direction, so that the front upper door hinge portion 700A can move to a larger extent in the left-right direction than the front door hinge portion 700B, in which the pivotal axis direction is the up-down direction. As a result, the front upper door 1105 is more likely to deviate in the left-right direction than the front door 1103. The positional deviation between the front upper door 1105 and the front door 1103 may degrade appearance design quality since the front upper door 1105 and the front door 1103 are a part of the appearance on the front side of the image forming apparatus 2 and occupy a large surface area on the front side.

Figure 9A:
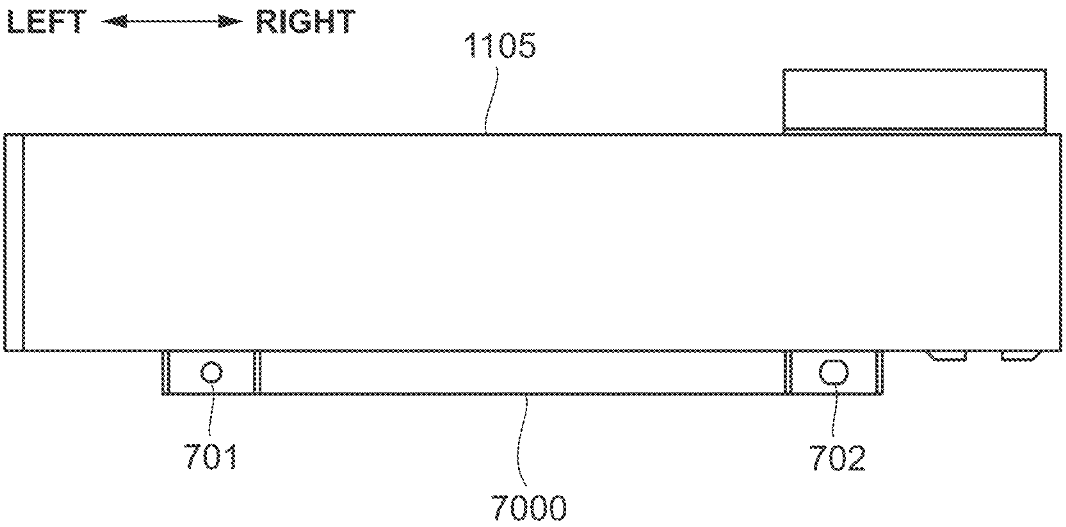
FIG. 9A is a front view of the front upper door.

Accordingly, in the present exemplary embodiment, the positional deviation between the front upper door 1105 and the front door 1103 is made less likely to occur in a state where both the front upper door 1105 and the front door 1103 are closed. A configuration according to the present exemplary embodiment for carrying out the above will be described below with reference to FIGS. 9A to 14B. FIG. 9A is a front view of the front upper door 1105, and FIG. 9B is a back view of the front upper door 1105.

<Positioning Portion>

Figure 9B:
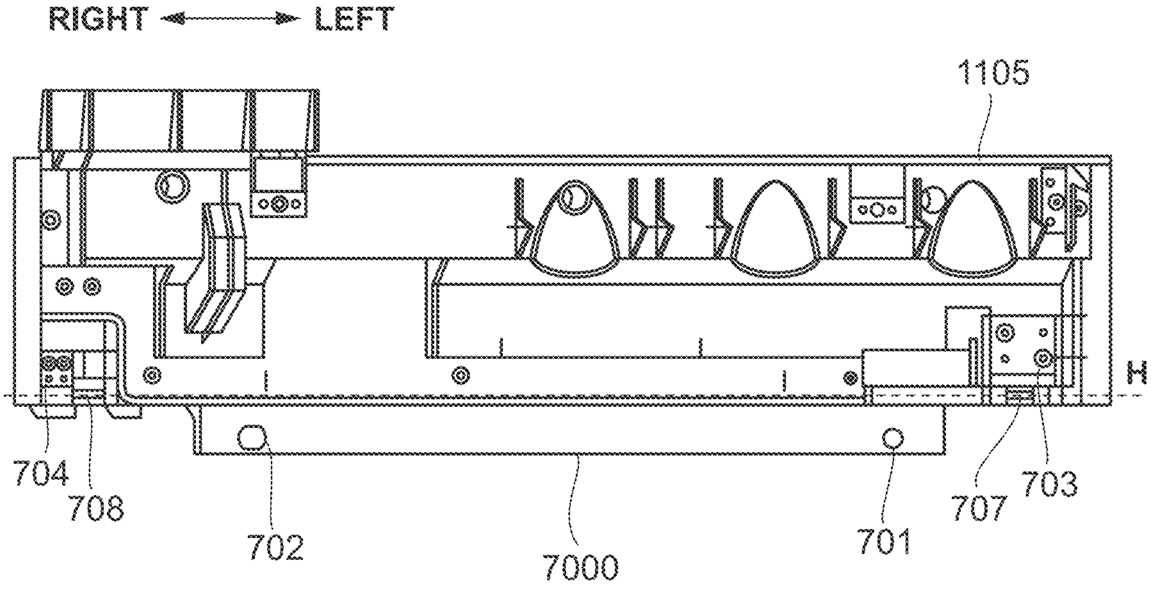
FIG. 9B is a back view of the front upper door, according to one or more exemplary embodiments of the present disclosure.

As illustrated in FIGS. 9A and 9B, a plate-like positioning portion 7000 is disposed at a lower end portion of the front upper door 1105. The positioning portion 7000 is disposed below a straight line H that connects the left hinge pin 707 and the right hinge pin 708, which are coaxially arranged in the up-down direction, on the inside of the front upper door left hinge 703 and the front upper door right hinge 704 that are disposed at both ends in the left-right direction. A left positioning hole 701 (or a first positioning hole) serving as a second fitting portion (or a first fitting portion) and a right positioning hole 702 (second positioning hole) are formed on the both ends of the positioning portion 7000 in the left-right direction. The thickness of each of the left positioning hole 701 and the right positioning hole 702 may be, for example, "1.6 mm or more and 3 mm or less".

The positioning portion 7000 may be formed integrally with the front upper door 1105 or separately from the front upper door 1105 using, for example, a PC/ABS resin, a polyacetal resin, or the like, or may be formed separately from the front upper door 1105 using metal. In the present exemplary embodiment, the configuration in which the left positioning hole 701 and the right positioning hole 702 are disposed on the inside of the front upper door left hinge 703 and the front upper door right hinge 704 is described as an example of the positioning portion 7000. However, the configuration of the positioning portion 7000 is not limited thereto. As the positioning portion 7000, for example, the left positioning hole 701 and the right positioning hole 702 may be disposed on the outside of the front upper door left hinge 703 and the front upper door right hinge 704, or one of the left positioning hole 701 and the right positioning hole 702 may be disposed on the inside of the front upper door left hinge 703 or the front upper door right hinge 704 and the other of the left positioning hole 701 and the right positioning hole 702 may be disposed on the outside of the front upper door left hinge 703 or the front upper door right hinge 704. The left positioning hole 701 and the right positioning hole 702 are not limited to through-holes, but instead may be holes other than the through-holes.

Figure 10:
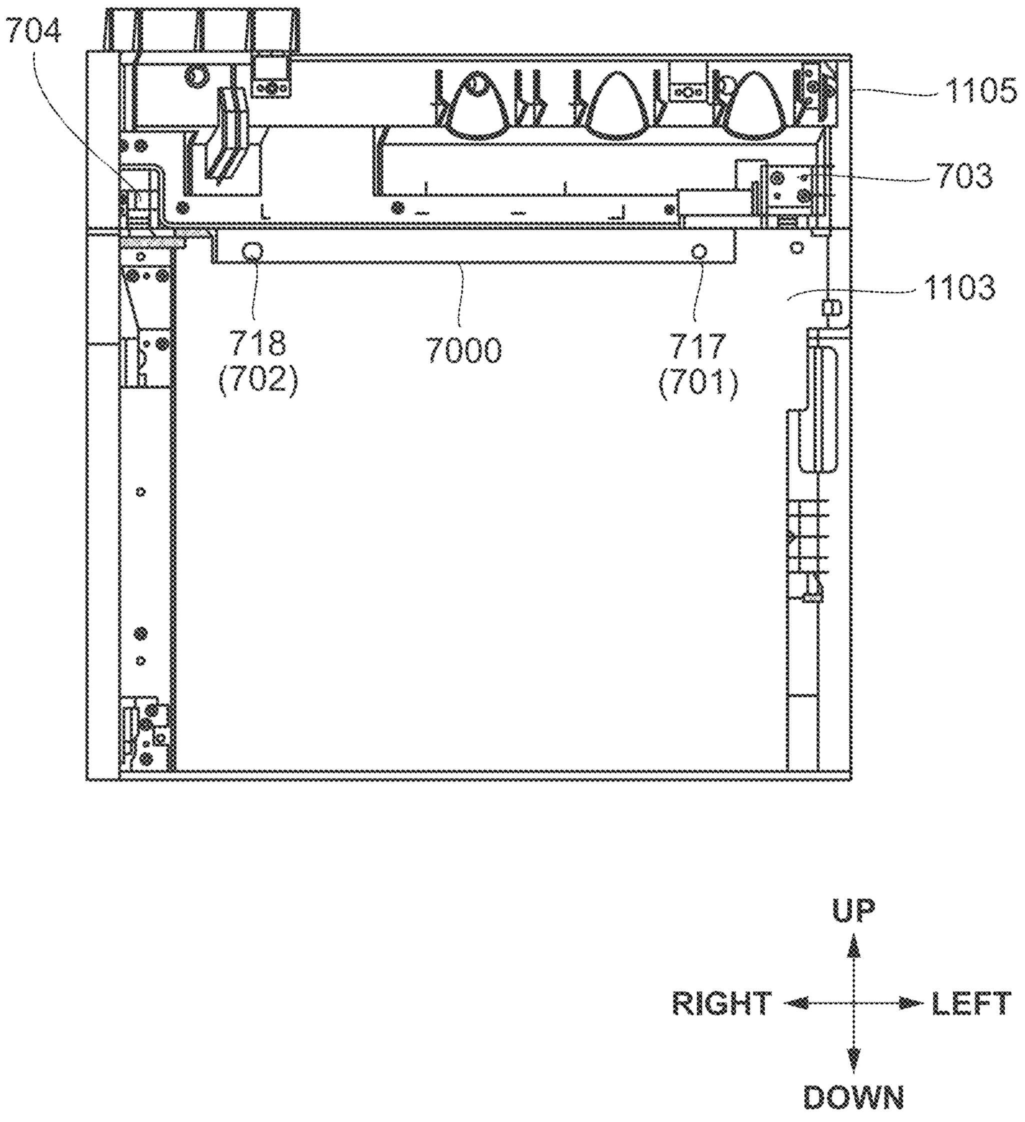
FIG. 10 is a back view illustrating a state where the front upper door and the front door are closed, according to one or more exemplary embodiments of the present disclosure.

FIG. 10 is a back view illustrating a state where the front upper door 1105 and the front door 1103 are closed. As illustrated in FIG. 10, on the front upper door 1105, the above-described positioning portion 7000 is disposed. The positioning portion 7000 is disposed to face a part of the front door 1103 as viewed in the front-back direction in the state where the front upper door 1105 and the front door 1103 are closed. On the other hand, in a facing region of the front door 1103 that faces the positioning portion 7000, a left positioning shaft 717 (first positioning shaft) that is loosely fitted into the left positioning hole 701 in the state where the front upper door 1105 and the front door 1103 are closed, and a right positioning shaft 718 (second positioning shaft) that is loosely fitted into the right positioning hole 702 are disposed. The left positioning shaft 717 and the right positioning shaft 718 each serving as the first fitting portion (or the second fitting portion) project from the back surface of the front door 1103 in the front-back direction orthogonal to the back surface as illustrated in FIG. 7. The left positioning shaft 717 and the right positioning shaft 718 each include a rod-like shaft portion having, for example, a circular or cross-shape cross section, and are directed backward in a state where the front door 1103 is closed.

The left positioning shaft 717 and the right positioning shaft 718 need not necessarily be formed integrally with the front door 1103, but instead may be formed separately from the front door 1103. However, it may be desirable to integrally form the left positioning shaft 717 and the right positioning shaft 718 with the front door 1103 using the same material as the material for the front door 1103. This is because the left positioning shaft 717 and the right positioning shaft 718 can be disposed at predetermined positions of the front door 1103 corresponding to the left positioning hole 701 and the right positioning hole 702 of the positioning portion 7000 with high accuracy.

Figure 11A:
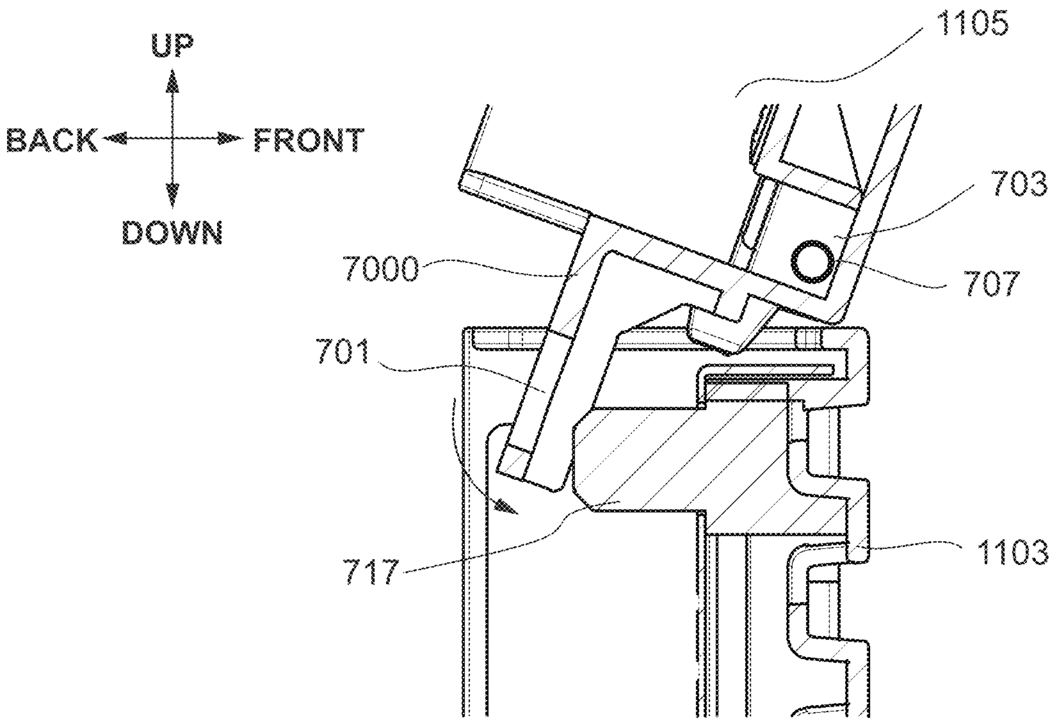
FIG. 11A is a sectional view illustrating a state of a left positioning shaft with respect to a left positioning hole in an up-down direction immediately before the left positioning shaft enters the left positioning hole.
Figure 11B:
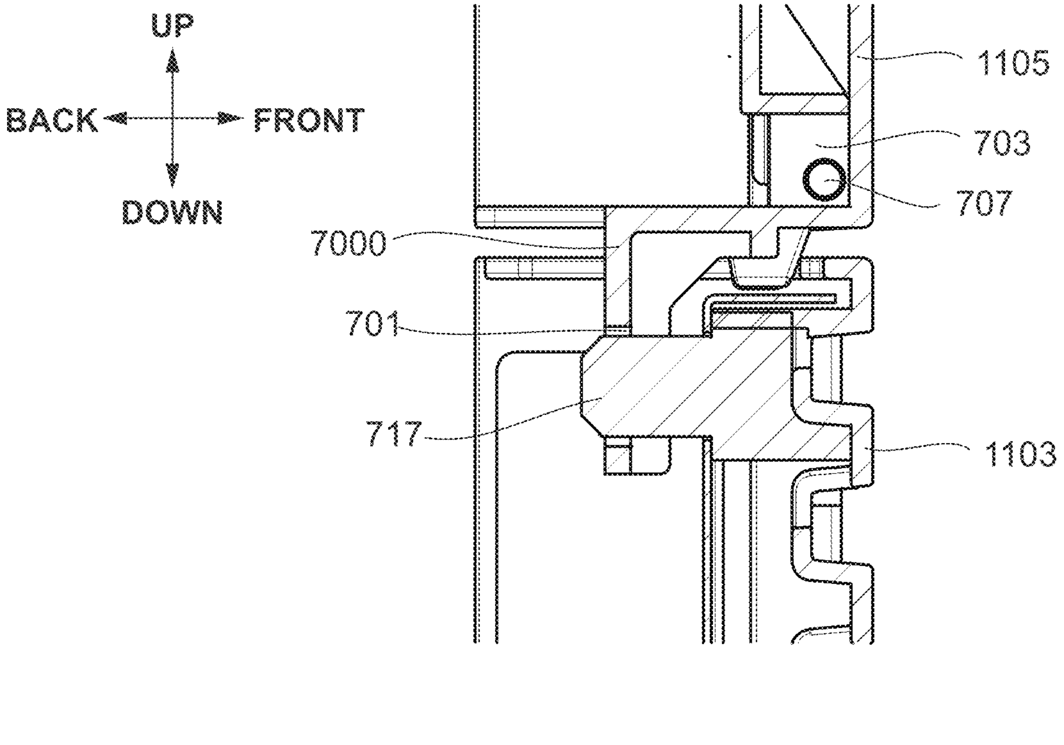
FIG. 11B illustrates a fitted state where the left positioning shaft has entered the left positioning hole, according to one or more exemplary embodiments of the present disclosure.
Figure 12A:
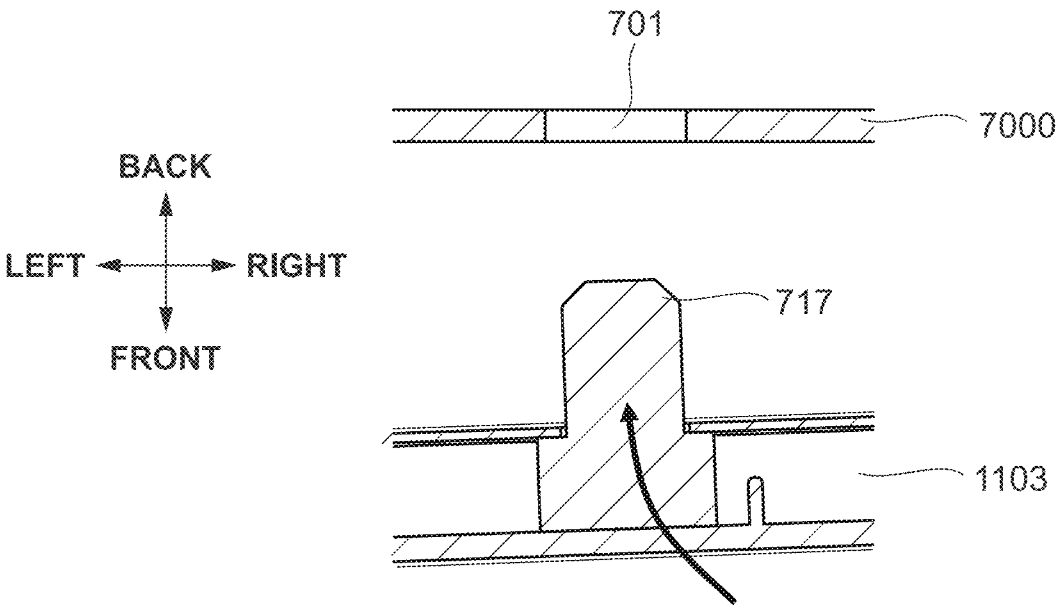
FIG. 12A is a sectional view in a horizontal direction illustrating a state of the left positioning shaft with respect to the left positioning hole immediately before the left positioning shaft enters the left positioning hole.
Figure 12B:
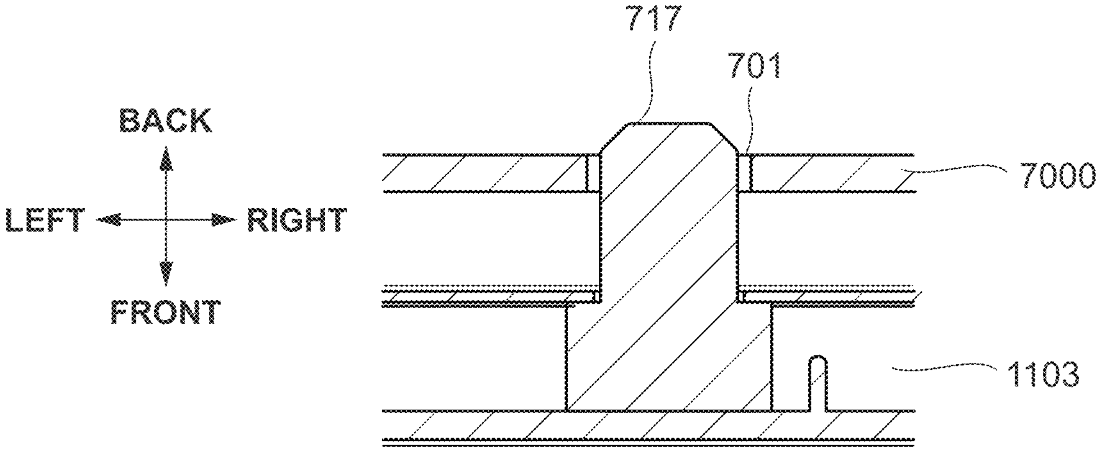
FIG. 12B illustrates a fitted state where the left positioning shaft has entered the left positioning hole, according to one or more exemplary embodiments of the present disclosure.

FIGS. 11A and 11B are sectional views in the up-down direction each illustrating a state of the left positioning shaft 717 with respect to the left positioning hole 701 when the front upper door 1105 is closed relative to the closed front door 1103. FIGS. 12A and 12B are sectional views in the horizontal direction each illustrating a state of the left positioning shaft 717 with respect to the left positioning hole 701 when the front door 1103 is closed relative to the closed front upper door 1105. FIGS. 11A and 12A each illustrate a state immediately before the left positioning shaft 717 enters the left positioning hole 701. FIGS. 11B and 12B each illustrate a fitted state where the left positioning shaft 717 has entered the left positioning hole 701.

As illustrated in FIGS. 11A and 11B, the front upper door 1105 is disposed to be pivotable relative to the front door 1103 in the closed state with the above-described front upper door hinge portion 700A (see FIGS. 6A and 6B, and only the front upper door left hinge 703 and the left hinge pin 707 are illustrated in FIGS. 11A and 11B).

If the front upper door 1105 is closed in a state where the front door 1103 is closed, the positioning portion 7000 pivots together with the front upper door 1105, thereby the left positioning shaft 717 of the front door 1103 enters the left positioning hole 701 of the positioning portion 7000. Simultaneously, although not illustrated herein, the right positioning shaft 718 of the front door 1103 enters the right positioning hole 702 of the positioning portion 7000 and is fitted into the right positioning hole 702 (see FIG. 10). On the other hand, if the front upper door 1105 is opened in a state where the front door 1103 and the front upper door 1105 are closed, the positioning portion 7000 pivots together with the front upper door 1105, thereby the left positioning shaft 717 is disengaged from the left positioning hole 701, and the fitted state is released. Simultaneously, the right positioning shaft 718 is disengaged from the right positioning hole 702, and the fitted state is released.

The front door 1103 is disposed to be pivotable relative to the front upper door 1105 in the closed state with the above-descried front door hinge portion 700B (see FIGS. 8A and 8B) as illustrated in FIGS. 12A and 12B. If the front door 1103 is closed in the state where the front upper door 1105 is closed, the left positioning shaft 717 of the front door 1103 pivots and enters the left positioning hole 701 of the positioning portion 7000, and is fitted into the left positioning hole 701. Simultaneously, although not illustrated herein, the right positioning shaft 718 of the front door 1103 enters the right positioning hole 702 of the positioning portion 7000 and is fitted into the right positioning hole 702 (see FIG. 10). On the other hand, if the front door 1103 is opened in a state where the front door 1103 and the front upper door 1105 are closed, the left positioning shaft 717 pivots together with the front door 1103, thereby the left positioning shaft 717 is disengaged from the left positioning hole 701, and the fitted state is released. Simultaneously, the right positioning shaft 718 is disengaged from the right positioning hole 702, and the fitted state is released.

Thus, in the state where the front upper door 1105 and the front door 1103 are closed, the shaft portion of the left positioning shaft 717 has entered the left positioning hole 701, and the leading end of the shaft portion of the left positioning shaft 717 projects from the left positioning hole 701 (see FIGS. 11B and 12B). Although not illustrated, the shaft portion of the right positioning shaft 718 has entered the right positioning hole 702, and the leading end of the shaft portion of the right positioning shaft 718 projects from the right positioning hole 702. An amount of projection of the left positioning shaft 717 from the left positioning hole 701 and an amount of projection of the right positioning shaft 718 from the right positioning hole 702 may be about "1 mm", for example, when the thickness of the positioning portion 7000 (specifically, the thickness of the left positioning hole 701 and the right positioning hole 702) is "1.6 mm or more and 3 mm or less".

In the present exemplary embodiment, as described above, when one of the front upper door 1105 and the front door 1103 is closed in a state where the other of the front upper door 1105 and the front door 1103 is closed, the left positioning shaft 717 enters the left positioning hole 701, and the right positioning shaft 718 enters the right positioning hole 702. In this case, inclined surfaces as illustrated in FIGS. 13A to 13C are formed so that the left positioning shaft 717 can easily enter the left positioning hole 701 and the right positioning shaft 718 can easily enter the right positioning hole 702.

Figure 13A:
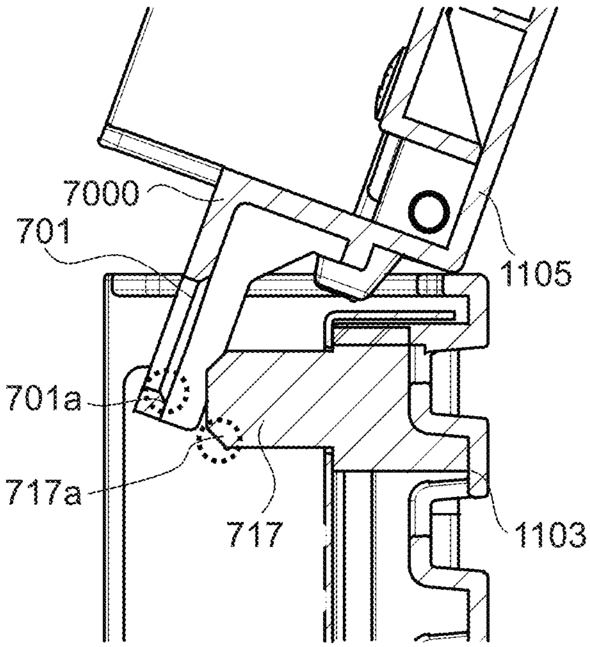
FIG. 13A is a sectional view illustrating a case where an inclined surface is formed on both a leading end of the left positioning shaft and the left positioning hole.

FIG. 13A illustrates a case where an inclined surface is formed on each of the left positioning shaft 717 and the left positioning hole 701. FIG. 13B illustrates a case where an inclined surface is formed only on the left positioning hole 701. FIG. 13C illustrates a case where an inclined surface is partially formed on the left positioning shaft 717. The right positioning shaft 718 and the right positioning hole 702 may have configurations similar to those of the left positioning shaft 717 and the left positioning hole 701 to be described below, and thus descriptions thereof are omitted.

As illustrated in FIG. 13A, an inclined surface 701*a* is formed on the inner periphery of the left positioning hole 701 in such a manner that the area of an opening on a side closer to the left positioning shaft 717 is larger than the area of an opening on a side farther from the left positioning shaft 717. The inclined surface 701*a* serving as a guide surface guides a leading end of the left positioning shaft 717 in conjunction with a closing operation of closing one of the front upper door 1105 and the front door 1103 in a state where the other of the front upper door 1105 and the front door 1103 is closed. On the other hand, an inclined surface 717*a* is formed on the whole circumference of the leading end of the left positioning shaft 717 such that the inclined surface 717*a* is inclined toward the center of the left positioning shaft 717 from an upstream side to a downstream side in a direction in which the left positioning shaft 717 is inserted into the left positioning hole 701. Thus, the inclined surface 701*a* is formed on the left positioning hole 701 and the inclined surface 717*a* is formed on the left positioning shaft 717, thereby the left positioning shaft 717 easily enters the left positioning hole 701.

Figure 13B:
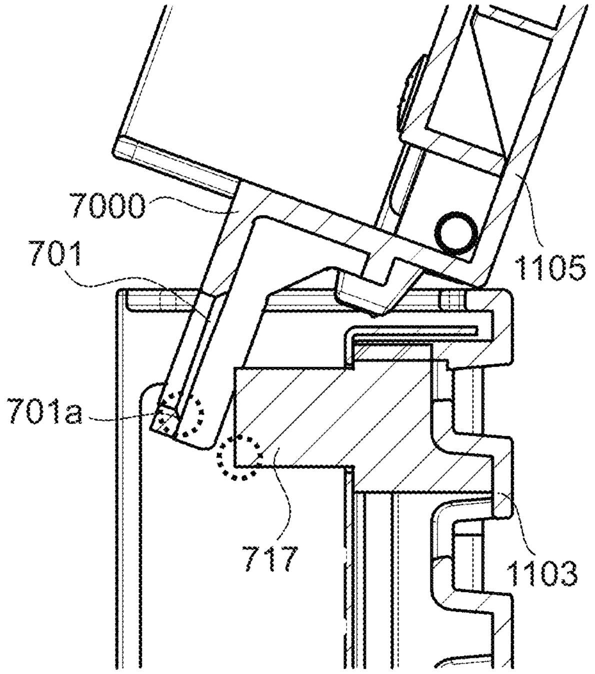
FIG. 13B is a sectional view illustrating a case where an inclined surface is formed only on the left positioning hole.
Figure 13C:
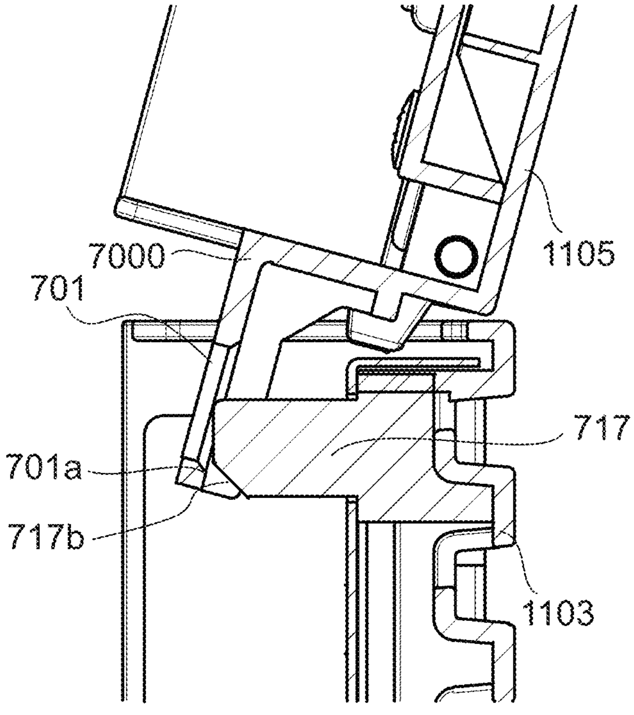
FIG. 13C is a sectional view illustrating a case where an inclined surface is formed on a circumferential surface on a lower end side at the leading end of the left positioning shaft, according to one or more exemplary embodiments of the present disclosure.

Alternatively, as illustrated in FIG. 13B, only the inclined surface 701*a* may be formed on the left positioning hole 701, and the inclined surface 717*a* may not be formed on the left positioning shaft 717.

Alternatively, as illustrated in FIG. 13C, the inclined surface 701*a* may be formed on the left positioning hole 701, and an inclined surface 717*b* may be formed only on a part on a lower end side of the left positioning shaft 717, instead of on the whole circumference of the left positioning shaft 717.

<Positioning Shaft and Positioning Hole>

Figure 14A:
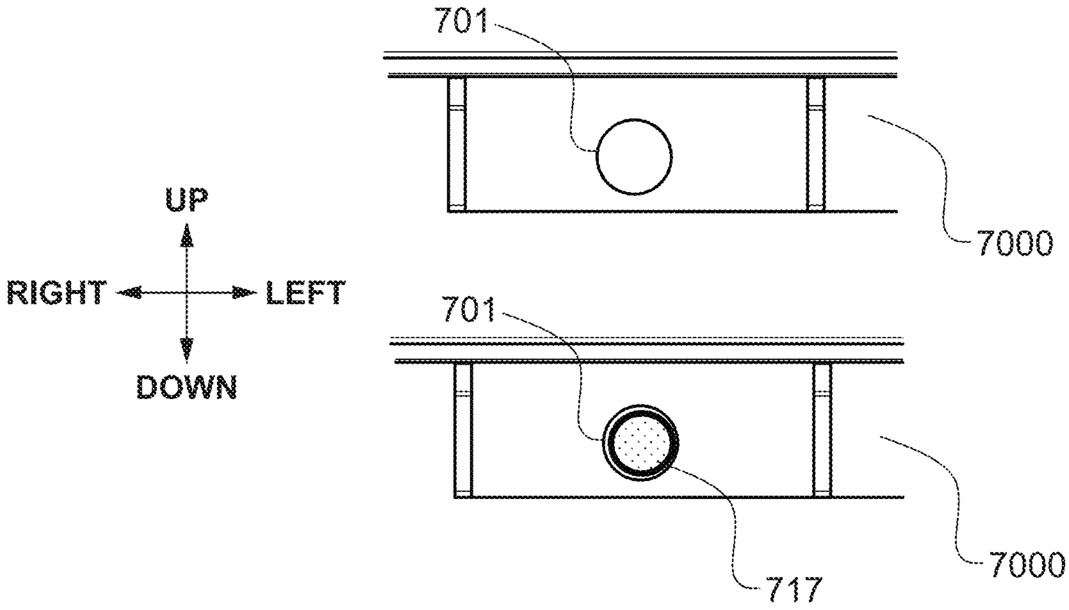
FIG. 14A illustrates a relationship between the left positioning hole and the left positioning shaft in a state where the front upper door and the front door are closed.
Figure 14B:
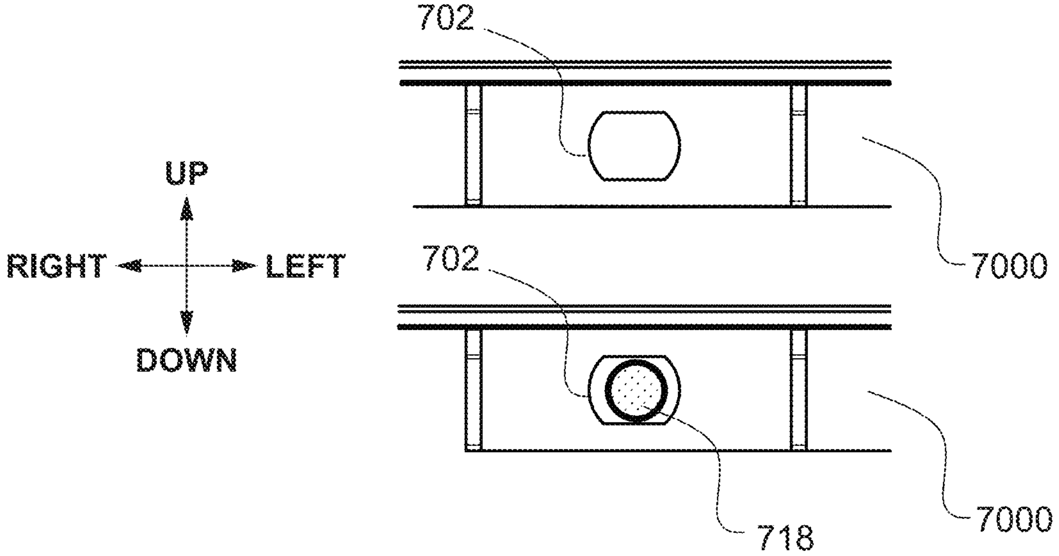
FIG. 14B illustrates a relationship between a right positioning hole and a right positioning shaft, according to one or more exemplary embodiments of the present disclosure.

FIG. 14A illustrates a relationship between the left positioning hole 701 and the left positioning shaft 717 in the state where the front upper door 1105 and the front door 1103 are closed. FIG. 14B illustrates a relationship between the right positioning hole 702 and the right positioning shaft 718 in the state where the front upper door 1105 and the front door 1103 are closed. In each of FIGS. 14A and 14B, an upper drawing illustrates a state before the left positioning shaft 717 or the right positioning shaft 718 enters the left positioning hole 701 or the right positioning hole 702, and a lower drawing illustrates a state after the left positioning shaft 717 or the right positioning shaft 718 has entered the left positioning hole 701 or the right positioning hole 702.

The shaft portion of the left positioning shaft 717 enters the left positioning hole 701 so that a movement of at least the front upper door hinge portion 700A in the pivotal axis direction (left-right direction in this case) can be regulated in the state where the front upper door 1105 and the front door 1103 are closed. As illustrated in FIG. 14A, the left positioning shaft 717 and the left positioning hole 701 are formed such that a gap in the left-right direction between the shaft portion of the left positioning shaft 717 and the left positioning hole 701 in the fitted state is smaller than the clearance in the left-right direction of the front upper door hinge portion 700A described above. With this configuration, a movement regulation range in the left-right direction of the left positioning shaft 717 by the left positioning hole 701 can be made smaller than the movable range in the left-right direction (dynamic clearance in the pivotal axis direction) of the front upper door hinge portion 700A.

The left positioning hole 701 may be, for example, a circular hole. In this case, in the state where the front upper door 1105 and the front door 1103 are closed, the movement of the left positioning shaft 717 is regulated not only in the left-right direction but also in the up-down direction by the left positioning hole 701. Alternatively, the left positioning hole 701 is not limited to a circular hole, but instead may be a hole of any shape as long as the movement in at least the left-right direction of the left positioning shaft 717 can be regulated to be within the movement regulation range described above. For example, the left positioning hole 701 may be a vertically-long hole that is long in the up-down direction.

On the other hand, the shaft portion of the right positioning shaft 718 enters the right positioning hole 702 so that the movement of at least the front upper door hinge portion 700A in the direction (up-down direction in this case) orthogonal to the pivotal axis direction can be regulated in the state where the front upper door 1105 and the front door 1103 are closed. As illustrated in FIG. 14B, the right positioning shaft 718 and the right positioning hole 702 are formed such that a gap in the up-down direction between the shaft portion of the right positioning shaft 718 and the right positioning hole 702 in the fitted state is smaller than the clearance in the up-down direction of the front door hinge portion 700B described above. With this configuration, a movement regulation range in the up-down direction of the right positioning shaft 718 by the right positioning hole 702 can be made smaller than the movable range in the up-down direction (dynamic clearance in the pivotal axis direction) of the front door hinge portion 700B. The right positioning hole 702 may be, for example, a circular hole, or may be a horizontally-long hole with a length in the left-right direction being longer than a length in the up-down direction. Therefore, the movement of the right positioning shaft 718 in the up-down direction is regulated by the right positioning hole 702 in the state where the front upper door 1105 and the front door 1103 are closed.

As described above, in the case where one of the front upper door 1105 and the front door 1103 is closed in the state where the other of the front upper door 1105 and the front door 1103 is closed, the left positioning shaft 717 of the front door 1103 enters the left positioning hole 701 of the positioning portion 7000. With this configuration, the front upper door 1105 and the front door 1103 are positioned in the left-right direction such that one of the front upper door 1105 and the front door 1103 to be positioned is positioned against the other of the front upper door 1105 and the front door 1103 that is closed. The dynamic clearance in the left-right direction of the positioned front upper door 1105 and front door 1103 is regulated within the range of the gap between the left positioning shaft 717 and the left positioning hole 701. This is smaller than the dynamic clearance in the left-right direction due to the front upper door hinge portion 700A. Accordingly, even when the front upper door 1105 is moved in the left-right direction by the front upper door hinge portion 700A, the front door 1103 follows the movement of the front upper door 1105 within a range smaller than the dynamic clearance in the left-right direction due to the front upper door hinge portion 700A, thereby the deviation between the front upper door 1105 and the front door 1103 in the left-right direction is less likely to occur.

Further, in the case where one of the front upper door 1105 and the front door 1103 is closed in the state where the other of the front upper door 1105 and the front door 1103 is closed, the right positioning shaft 718 of the front door 1103 enters the right positioning hole 702 of the positioning portion 7000. With this configuration, the front upper door 1105 and the front door 1103 are positioned in the up-down direction such that one of the front upper door 1105 and the front door 1103 to be positioned is positioned against the other of the front upper door 1105 and the front door 1103 that is closed. The dynamic clearance in the up-down direction of the positioned front upper door 1105 and front door 1103 is regulated within the range of the gap between the right positioning shaft 718 and the right positioning hole 702. This is smaller than the dynamic clearance in the up-down direction due to the front door hinge portion 700B. Accordingly, even when the front door 1103 is moved in the up-down direction by the front door hinge portion 700B, the front upper door 1105 follows the movement of the front door 1103 within a range smaller than the dynamic clearance in the up-down direction due to the front door hinge portion 700B, thereby the deviation between the front upper door 1105 and the front door 1103 in the up-down direction is less likely to occur.

As described above, in the present exemplary embodiment, the positioning portion 7000 in which the positioning holes (701, 702) are formed is disposed on the front upper door 1105, and the positioning shafts (717, 718) that enter the positioning holes (701, 702), respectively, are disposed on the front door 1103. When one of the front upper door 1105 and the front door 1103 is closed in the state where the other of the front upper door 1105 and the front door 1103 is closed, a relative positional relationship between the two doors, i.e., the front upper door 1105 and the front door 1103, is determined by the positioning holes (701, 702) and the positioning shafts (717, 718). In the state where the front upper door 1105 and the front door 1103 are closed, the dynamic clearance in the left-right direction and the up-down direction is regulated by the positioning holes (701, 702) and the positioning shafts (717, 718). Accordingly, even when one of the front door 1103 and the front upper door 1105 is moved by the corresponding hinge portion, the other of the front door 1103 and the front upper door 1105 follows the movement of the one of the front door 1103 and the front upper door 1105, thereby the deviation between the front upper door 1105 and the front door 1103 is less likely to occur. This configuration makes it possible to reduce, especially, relative positional deviation in the left-right direction between the two adjacent doors, i.e., the front upper door 1105 and the front door 1103.

While the above-described exemplary embodiment illustrates an example where the front upper door 1105 has the positioning holes (701, 702) and the front door 1103 includes the positioning shafts (717, 718), the present disclosure is not limited to this example. For example, the front door 1103 may have the positioning holes (701, 702) and the front upper door 1105 may include the positioning shafts (717, 718).

Figure 15:
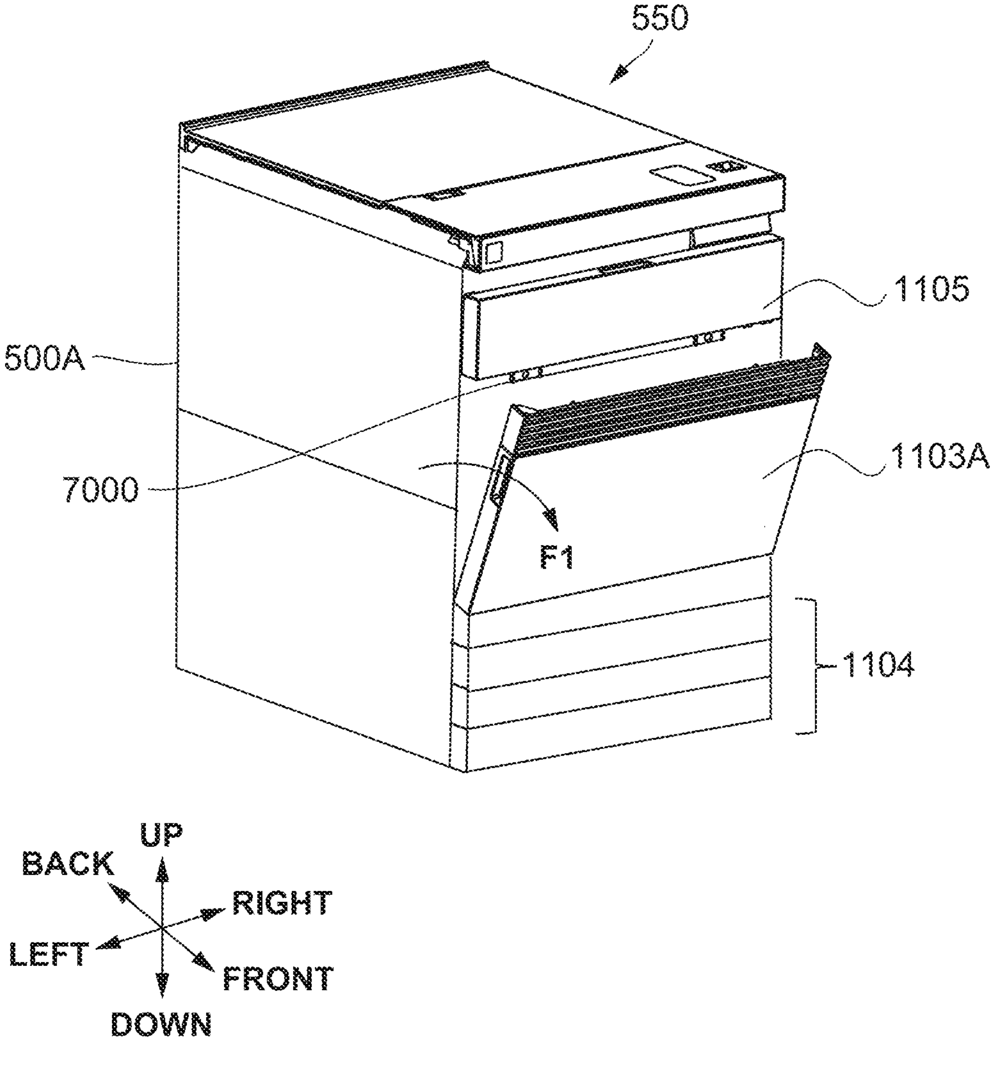
FIG. 15 is a perspective view illustrating an image forming transfer device in which the front upper door and the front door pivot in the same direction, according to one or more exemplary embodiments of the present disclosure.

While the above-described exemplary embodiment illustrates an example where, as illustrated in FIGS. 4A and 4B, the front upper door 1105 pivots in the direction indicated by the arrow F1 and the front door 1103 pivots in the direction indicated by the arrow F2, the present disclosure is not limited to this example. For example, the front door 1103 may also pivot in the direction indicated by the arrow F1, similar to the front upper door 1105. FIG. 15 illustrates an image forming transfer device 550 in which the front upper door 1105 and a front door 1103A pivot in the same direction (arrow F1).

As illustrated in FIG. 15, similar to the front upper door 1105, the front door 1103A pivots in the direction indicated by the arrow F1 about a hinge pin, which is disposed on the housing 500A in the horizontal direction (left-right direction), as a pivot shaft. Also in this case, as described above, the positioning portion 7000 is disposed on the front upper door 1105 and the positioning shafts (717, 718) are disposed on the front door 1103A, to thereby determine the relative positional relationship between the two doors, i.e., the front upper door 1105 and the front door 1103A. Even when one of the front door 1103A and the front upper door 1105 moves, the other of the front door 1103A and the front upper door 1105 follows the movement of the one of the front door 1103A and the front upper door 1105, thereby deviation between the front upper door 1105 and the front door 1103A is less likely to occur.

Alternatively, although not illustrated, the front upper door 1105 may pivot in the direction indicated by the arrow F2 (see FIG. 4A), and the front door 1103 may pivot in the direction indicated by the arrow F1 (see FIG. 4A).

According to an aspect of the present disclosure, it is possible to reduce relative positional deviation in the left-right direction between adjacent doors in an image forming apparatus including a plurality of doors.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-123061, filed Jul. 28, 2023, which is hereby incorporated by reference herein in its entirety.

What is claimed is:

1. An image forming apparatus configured to form an image on a recording medium, the image forming apparatus comprising:

a first door configured to pivot about a first pivot shaft extending along a left-right direction in the image forming apparatus, an inside of the image forming apparatus being accessible in a state where the first door is open; and a second door configured to pivot about a second pivot shaft extending along the left-right direction, the inside of the image forming apparatus being accessible in a state where the second door is open, wherein the first door includes a first fitting portion configured to pivot integrally with the first door, wherein the second door includes a second fitting portion configured to pivot integrally with the second door and to be fitted into the first fitting portion, wherein, in a state where the first door is closed, the first fitting portion and the second fitting portion are fitted to each other to regulate a position of the first door relative to the second door in the left-right direction, wherein the first fitting portion projects toward the inside of the image forming apparatus in the state where the first door is closed, and wherein the second fitting portion has a shape of a hole into which the first fitting portion is inserted.

2. The image forming apparatus according to claim 1, wherein, in the state where the first door is open, fitting between the first fitting portion and the second fitting portion is released.

3. The image forming apparatus according to claim 2, wherein, in a state where the first door is open and the fitting between the first fitting portion and the second fitting portion is released, the second door is closed.

4. The image forming apparatus according to claim 1, wherein, in the state where the second door is open, fitting between the first fitting portion and the second fitting portion is released.

5. The image forming apparatus according to claim 4, wherein, in a state where the second door is open and the fitting between the first fitting portion and the second fitting portion is released, the first door is closed.

6. The image forming apparatus according to claim 1, wherein the first fitting portion has a surface which is inclined from an upstream side to a downstream side in a direction in which the first fitting portion is inserted into the second fitting portion.

7. The image forming apparatus according to claim 1, wherein the second door is supported to be pivotable by a first hinge and a second hinge, the second hinge being disposed at a position different from a position of the first hinge in the left-right direction.

8. The image forming apparatus according to claim 7, wherein the second fitting portion is disposed between the first hinge and the second hinge in the left-right direction.

9. The image forming apparatus according to claim 1, wherein the first door and the second door are adjacent to each other in a vertical direction.

10. An image forming apparatus configured to form an image on a recording medium, the image forming apparatus comprising:

a first door configured to pivot about a first pivot shaft extending along a vertical direction, an inside of the image forming apparatus being accessible in a state where the first door is open; and a second door configured to pivot about a second pivot shaft extending along a left-right direction in the image forming apparatus, wherein the first door includes a first fitting portion configured to pivot integrally with the first door, wherein the second door includes a second fitting portion configured to be fitted into the first fitting portion, wherein, in a state where the first door is closed, the first fitting portion and the second fitting portion are fitted to each other to regulate a position of the first door relative to the second door in the left-right direction, wherein the first fitting portion projects toward the inside of the image forming apparatus in the state where the first door is closed, and wherein the second fitting portion has a shape of a hole into which the first fitting portion is inserted.

11. The image forming apparatus according to claim 10, wherein, in the state where the first door is open, fitting between the first fitting portion and the second fitting portion is released.

12. The image forming apparatus according to claim 11, wherein, in a state where the first door is open and the fitting between the first fitting portion and the second fitting portion is released, the second door is closed.

13. The image forming apparatus according to claim 10, wherein, in the state where the second door is open, fitting between the first fitting portion and the second fitting portion is released.

14. The image forming apparatus according to claim 13, wherein, in a state where the second door is open and the fitting between the first fitting portion and the second fitting portion is released, the first door is closed.

15. The image forming apparatus according to claim 10, wherein the first fitting portion has a surface which is inclined from an upstream side to a downstream side in a direction in which the first fitting portion is inserted into the second fitting portion.

16. The image forming apparatus according to claim 10, wherein the second door is supported to be pivotable by a first hinge and a second hinge, the second hinge being disposed at a position different from a position of the first hinge in the left-right direction.

17. The image forming apparatus according to claim 16, wherein the second fitting portion is disposed between the first hinge and the second hinge in the left-right direction.

18. The image forming apparatus according to claim 10, wherein the first door and the second door are adjacent to each other in a vertical direction.

* * * * *